United States Patent
Garin et al.

(10) Patent No.: US 9,432,964 B2
(45) Date of Patent: Aug. 30, 2016

(54) METHOD AND APPARATUS FOR DETERMINING LOCATIONS OF ACCESS POINTS

(71) Applicant: QUALCOMM Incorporated, San Diego, CA (US)

(72) Inventors: Lionel Jacques Garin, Palo Alto, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 13/831,403

(22) Filed: Mar. 14, 2013

(65) Prior Publication Data

US 2013/0307723 A1 Nov. 21, 2013

Related U.S. Application Data

(60) Provisional application No. 61/649,915, filed on May 21, 2012.

(51) Int. Cl.
*G01S 3/02* (2006.01)
*H04W 64/00* (2009.01)
(Continued)

(52) U.S. Cl.
CPC .......... *H04W 64/003* (2013.01); *G01S 5/0242* (2013.01); *G01S 5/0284* (2013.01);
(Continued)

(58) Field of Classification Search
CPC .............. H04W 64/003; G01S 5/0242; G01S 5/0284; G01S 5/06; G01S 5/14; G01S 11/06; G01S 19/46; G01S 5/021; G01S 5/0252

USPC .......................................................... 342/458
See application file for complete search history.

(56) References Cited

U.S. PATENT DOCUMENTS

2002/0008661 A1* 1/2002 McCall ................ G01C 21/165
342/357.3
2002/0171586 A1* 11/2002 Martorana .............. G01S 5/021
342/458

(Continued)

FOREIGN PATENT DOCUMENTS

EP 2042885 A1 4/2009
EP 2042885 B1 * 10/2009
(Continued)

OTHER PUBLICATIONS

International Preliminary Report on Patentability, PCT/US2013/041679, Nov. 25, 2014.*

(Continued)

*Primary Examiner* — Frank J McGue
(74) *Attorney, Agent, or Firm* — Kilpatrick Townsend & Stockton LLP

(57) ABSTRACT

Methods, systems, computer-readable media, and apparatuses for determining locations of access points (AP) are presented. Techniques are described for determining relative and absolute locations of APs. In one embodiment, a device may send and receive messages to one or more APs for from various locations for determining the distance between the device and the AP. The device may additionally keep track of its own displacement for the purposes of determining the location of the one or more APs. In one embodiment, the device also determines the turnaround calibration factor (TCF) for the AP that compensates for the processing time at the AP may also be used for increasing the accuracy of the determination of the location of the AP.

28 Claims, 13 Drawing Sheets

(51) Int. Cl.
  *G01S 19/46* (2010.01)
  *G01S 5/06* (2006.01)
  *G01S 5/14* (2006.01)
  *G01S 11/06* (2006.01)
  *G01S 5/02* (2010.01)

(52) U.S. Cl.
  CPC  *G01S 5/06* (2013.01); *G01S 5/14* (2013.01); *G01S 11/06* (2013.01); *G01S 19/46* (2013.01); *G01S 5/021* (2013.01); *G01S 5/0252* (2013.01)

(56) References Cited

U.S. PATENT DOCUMENTS

| | | | |
|---|---|---|---|
| 2005/0186965 A1* | 8/2005 | Pagonis | G01S 5/0072 455/456.1 |
| 2007/0002813 A1 | 1/2007 | Tenny et al. | |
| 2007/0082677 A1* | 4/2007 | Donald Hart | H04W 16/18 455/456.1 |
| 2007/0121560 A1 | 5/2007 | Edge | |
| 2009/0131075 A1 | 5/2009 | Mazlum et al. | |
| 2010/0208711 A1* | 8/2010 | Georgis | H04W 64/00 370/338 |
| 2012/0129461 A1 | 5/2012 | Venkatraman | |
| 2012/0326922 A1* | 12/2012 | Yang | G01S 19/49 342/357.3 |

FOREIGN PATENT DOCUMENTS

| | | |
|---|---|---|
| EP | 2219401 A2 | 8/2010 |
| EP | 2219401 B1 * | 8/2010 |
| WO | 2008022622 A1 | 2/2008 |

OTHER PUBLICATIONS

International Search Report, PCT/US2013/041679, Jan. 1, 2014.*
International Search Report and Written Opinion—PCT/US2013/041679, International Search Authority—European Patent Office, Jan. 23, 2014.

* cited by examiner

METHOD AND APPARATUS FOR DETERMINING LOCATIONS OF ACCESS POINTS

CROSS-REFERENCE TO RELATED APPLICATIONS

This patent application claims the benefit of U.S. Provisional Patent Application No. 61/649,915 filed May 21, 2012, and entitled "RTT-BASED CROWD SOURCING ARCHITECTURE" which is incorporated by reference herein in its entirety for all purposes.

BACKGROUND

Aspects of the disclosure relate to computing and communication technologies. In particular, aspects of the disclosure relate to wireless networks, such as systems, methods, apparatuses, and computer-readable media for determining the location of access points (APs) in a wireless network.

Traditional techniques enable determination of locations of access points in a wireless network using a-priori knowledge about the APs, "war-driving" or "war-walking," or systematic surveys. A-prior knowledge from venue owners may be very diffused, inaccurate, and prone to operator mistakes. "War-driving" or "war-walking," which refers to the active act of driving or walking, respectively, around an area to find network APs, and is an example of crowd-sourcing. These methods of identifying APs typically use received signal strength indication (RSSI) measurements from outside a building. RSSI measurements may be used to create "heat maps" indicating signal strength in locations near an AP. Such systems and methods have drawbacks, including poor ability to measure indoor locations, large variations between devices and users, and poor accuracy. Systematic surveys may also have very high costs associated with collecting information and errors introduced due to inaccuracies in ground truth references.

The current systems describe alternative and improved systems for identifying APs.

BRIEF SUMMARY

Various systems, methods, apparatuses, and computer-readable media for determining locations of APs are described. Techniques are described for determining relative and absolute locations of APs. In one embodiment, a device may send and receive messages to one or more APs from various locations for determining the distance between the device and the AP. The device may additionally keep track of its own displacement for the purposes of determining the location of the one or more APs. In one embodiment, the device also determines the turnaround calibration factor (TCF) for the AP that compensates for the processing time at the AP and may be used for increasing the accuracy of the determination of the location of the AP.

In some embodiments, the device may use RSSI for determining the location of the AP. In other embodiments, the device may use round trip time (RTT). Rather than relying on signal strength, RTT measurements identify a time for a signal from a device to travel to and from an AP, with a turnaround calibration factor (TCF) compensating for processing time at the AP. The device may use RTT by itself or along with RSSI for determining the location of one or more APs. In other implementations, yet other techniques may be used in determining relative distances without departing from the scope of the invention.

An example method for determining location of access points (AP) may include obtaining, at a mobile device, a first plurality of distance-related measurements associated with a first location, comprising at least a first distance-related measurement between the mobile device at the first location and a first AP and a second distance-related measurement between the mobile device at the first location and a second AP, obtaining, at the mobile device, a second plurality of distance-related measurements associated with a second location, comprising at least a third distance-related measurement between the mobile device at the second location and the first AP and a fourth distance-related measurement between the mobile device at the second location and the second AP, accessing, at the mobile device, location information associated with a movement of the mobile device from the first location to the second location, and determining, by the mobile device, a relative location of the first AP compared with the second AP by determining an inter-distance measurement of the first AP and the second AP, based at least in part on the first plurality of distance-related measurements, the second plurality of distance-related measurements and the location information. In certain embodiments, the location information associated with the movement of the mobile device comprises at least determining, by the mobile device, relative locations based on a pedometer or/and an inertial sensor operated by the mobile device.

In certain embodiments, the method may include obtaining, at the mobile device, an absolute location of the second AP from a server or a Global Navigation Satellite System (GNSS), determining, by the mobile device, the absolute location of the first AP, based at least in part on the absolute location of the second AP and the inter-distance measurement of the first AP and the second AP, and sending, by the mobile device, to the server the absolute location of the first AP.

In one embodiment the first plurality of distance-related measurements and the second plurality of distance-related measurements comprise round trip time (RTT) measurements between the mobile device and each AP. In another embodiment, the first plurality of distance-related measurements and the second plurality of distance-related measurements comprise received signal strength indication (RSSI) measurements.

In one embodiment, the method further comprises using a turnaround calibration factor (TCF) for each AP in determining, by the mobile device, the inter-distance measurement of the first AP and the second AP, wherein TCF for an AP comprises turn-around time of the AP between reception of a packet and retransmission of a response packet. The turn-around time of the AP may comprise at least processing time of the AP for responding to a request from the mobile device.

In certain embodiments, the TCF for at least the first AP may be determined by the mobile device, and determining the TCF may comprises obtaining, at the mobile device, at least three distance-related measurements between the mobile device and the first AP, wherein each of the at least three distance-related measurements are obtained at different locations, obtaining, at the mobile device, TCF-related location information of the mobile device each time one of the at least three distance-related measurements is obtained, and determining, by the mobile device, the TCF of the first AP, based at least in part on the at least three distance-related measurements and the TCF-related location information of the mobile device obtained during each time the at least three distance-related measurements are obtained.

In one embodiment, the method may further include sending, by the mobile device, the absolute location of the first AP to a server, wherein the server combines the absolute location of the first AP with previously stored AP location data to create an updated first AP location for communicating the first AP location to a second mobile device. In one aspect, the method further includes combining, by the mobile device, the absolute location of the first AP with received signal strength indication (RS SI) measurements to create an AP map.

An example mobile device for determining location of access points (AP) may include obtaining, at a mobile device, a first plurality of distance-related measurements associated with a first location, comprising at least a first distance-related measurement between the mobile device at the first location and a first AP and a second distance-related measurement between the mobile device at the first location and a second AP, obtaining, at the mobile device, a second plurality of distance-related measurements associated with a second location, comprising at least a third distance-related measurement between the mobile device at the second location and the first AP and a fourth distance-related measurement between the mobile device at the second location and the second AP, accessing, at the mobile device, location information associated with a movement of the mobile device from the first location to the second location, and determining, by the mobile device, a relative location of the first AP compared with the second AP by determining an inter-distance measurement of the first AP and the second AP, based at least in part on the first plurality of distance-related measurements, the second plurality of distance-related measurements and the location information. In certain embodiments, the location information associated with the movement of the mobile device comprises at least determining, by the mobile device, relative locations based on a pedometer or/and an inertial sensor operated by the mobile device.

In certain embodiments, the mobile device may include obtaining, at the mobile device, an absolute location of the second AP from a server or a Global Navigation Satellite System (GNSS), determining, by the mobile device, the absolute location of the first AP, based at least in part on the absolute location of the second AP and the inter-distance measurement of the first AP and the second AP, and sending, by the mobile device, to the server the absolute location of the first AP.

In one embodiment the first plurality of distance-related measurements and the second plurality of distance-related measurements comprise round trip time (RTT) measurements between the mobile device and each AP. In another embodiment, the first plurality of distance-related measurements and the second plurality of distance-related measurements comprise received signal strength indication (RSSI) measurements.

In one embodiment, the mobile device further comprises using a turnaround calibration factor (TCF) for each AP in determining, by the mobile device, the inter-distance measurement of the first AP and the second AP, wherein TCF for an AP comprises turn-around time of the AP between reception of a packet and retransmission of a response packet. The turn-around time of the AP may comprise at least processing time of the AP for responding to a request from the mobile device.

In certain embodiments, the TCF for at least the first AP may be determined by the mobile device, and determining the TCF may comprises obtaining, at the mobile device, at least three distance-related measurements between the mobile device and the first AP, wherein each of the at least three distance-related measurements are obtained at different locations, obtaining, at the mobile device, TCF-related location information of the mobile device each time one of the at least three distance-related measurements is obtained, and determining, by the mobile device, the TCF of the first AP, based at least in part on the at least three distance-related measurements and the TCF-related location information of the mobile device obtained during each time the at least three distance-related measurements are obtained.

In one embodiment, the mobile device may further include sending, by the mobile device, the absolute location of the first AP to a server, wherein the server combines the absolute location of the first AP with previously stored AP location data to create an updated first AP location for communicating the first AP location to a second mobile device. In one aspect, the mobile device further includes combining, by the mobile device, the absolute location of the first AP with received signal strength indication (RSSI) measurements to create an AP map.

An example non-transitory computer readable storage medium, wherein the non-transitory computer readable storage medium comprises instructions executable by a processor, the instructions comprising instructions for determining location of access points (AP) may include obtaining, at a mobile device, a first plurality of distance-related measurements associated with a first location, comprising at least a first distance-related measurement between the mobile device at the first location and a first AP and a second distance-related measurement between the mobile device at the first location and a second AP, obtaining, at the mobile device, a second plurality of distance-related measurements associated with a second location, comprising at least a third distance-related measurement between the mobile device at the second location and the first AP and a fourth distance-related measurement between the mobile device at the second location and the second AP, accessing, at the mobile device, location information associated with a movement of the mobile device from the first location to the second location, and determining, by the mobile device, a relative location of the first AP compared with the second AP by determining an inter-distance measurement of the first AP and the second AP, based at least in part on the first plurality of distance-related measurements, the second plurality of distance-related measurements and the location information. In certain embodiments, the location information associated with the movement of the mobile device comprises at least determining, by the mobile device, relative locations based on a pedometer or/and an inertial sensor operated by the mobile device.

In certain embodiments, the method may include obtaining, at the mobile device, an absolute location of the second AP from a server or a Global Navigation Satellite System (GNSS), determining, by the mobile device, the absolute location of the first AP, based at least in part on the absolute location of the second AP and the inter-distance measurement of the first AP and the second AP, and sending, by the mobile device, to the server the absolute location of the first AP.

In one embodiment the first plurality of distance-related measurements and the second plurality of distance-related measurements comprise round trip time (RTT) measurements between the mobile device and each AP. In another embodiment, the first plurality of distance-related measurements and the second plurality of distance-related measurements comprise received signal strength indication (RSSI) measurements.

In one embodiment, the instructions further comprises using a turnaround calibration factor (TCF) for each AP in determining, by the mobile device, the inter-distance measurement of the first AP and the second AP, wherein TCF for an AP comprises turn-around time of the AP between reception of a packet and retransmission of a response packet. The turn-around time of the AP may comprise at least processing time of the AP for responding to a request from the mobile device.

In certain embodiments, the TCF for at least the first AP may be determined by the mobile device, and determining the TCF may comprises obtaining, at the mobile device, at least three distance-related measurements between the mobile device and the first AP, wherein each of the at least three distance-related measurements are obtained at different locations, obtaining, at the mobile device, TCF-related location information of the mobile device each time one of the at least three distance-related measurements is obtained, and determining, by the mobile device, the TCF of the first AP, based at least in part on the at least three distance-related measurements and the TCF-related location information of the mobile device obtained during each time the at least three distance-related measurements are obtained.

In one embodiment, the instructions may further include sending, by the mobile device, the absolute location of the first AP to a server, wherein the server combines the absolute location of the first AP with previously stored AP location data to create an updated first AP location for communicating the first AP location to a second mobile device. In one aspect, the instructions further includes combining, by the mobile device, the absolute location of the first AP with received signal strength indication (RSSI) measurements to create an AP map.

An example mobile device for determining location of access points (AP) may include means for obtaining, at a mobile device, a first plurality of distance-related measurements associated with a first location, comprising at least a first distance-related measurement between the mobile device at the first location and a first AP and a second distance-related measurement between the mobile device at the first location and a second AP, means for obtaining, at the mobile device, a second plurality of distance-related measurements associated with a second location, comprising at least a third distance-related measurement between the mobile device at the second location and the first AP and a fourth distance-related measurement between the mobile device at the second location and the second AP, means for accessing, at the mobile device, location information associated with a movement of the mobile device from the first location to the second location, and means for determining, by the mobile device, a relative location of the first AP compared with the second AP by determining an inter-distance measurement of the first AP and the second AP, based at least in part on the first plurality of distance-related measurements, the second plurality of distance-related measurements and the location information. In certain embodiments, the location information associated with the movement of the mobile device comprises at least determining, by the mobile device, relative locations based on a pedometer or/and an inertial sensor operated by the mobile device.

In certain embodiments, the mobile device may include obtaining, at the mobile device, an absolute location of the second AP from a server or a Global Navigation Satellite System (GNSS), determining, by the mobile device, the absolute location of the first AP, based at least in part on the absolute location of the second AP and the inter-distance measurement of the first AP and the second AP, and sending, by the mobile device, to the server the absolute location of the first AP.

In one embodiment the first plurality of distance-related measurements and the second plurality of distance-related measurements comprise round trip time (RTT) measurements between the mobile device and each AP. In another embodiment, the first plurality of distance-related measurements and the second plurality of distance-related measurements comprise received signal strength indication (RSSI) measurements.

In one embodiment, the mobile device further comprises using a turnaround calibration factor (TCF) for each AP in determining, by the mobile device, the inter-distance measurement of the first AP and the second AP, wherein TCF for an AP comprises turn-around time of the AP between reception of a packet and retransmission of a response packet. The turn-around time of the AP may comprise at least processing time of the AP for responding to a request from the mobile device.

In certain embodiments, the TCF for at least the first AP may be determined by the mobile device, and determining the TCF may comprises means for obtaining, at the mobile device, at least three distance-related measurements between the mobile device and the first AP, wherein each of the at least three distance-related measurements are obtained at different locations, means for obtaining, at the mobile device, TCF-related location information of the mobile device each time one of the at least three distance-related measurements is obtained, and means for determining, by the mobile device, the TCF of the first AP, based at least in part on the at least three distance-related measurements and the TCF-related location information of the mobile device obtained during each time the at least three distance-related measurements are obtained.

In one embodiment, the mobile device may further include sending, by the mobile device, the absolute location of the first AP to a server, wherein the server combines the absolute location of the first AP with previously stored AP location data to create an updated first AP location for communicating the first AP location to a second mobile device. In one aspect, the mobile device further includes combining, by the mobile device, the absolute location of the first AP with received signal strength indication (RSSI) measurements to create an AP map.

In certain embodiments, some or all of the method steps described above in reference to the mobile device may also be performed by the server. In some embodiments, the server may include an example non-transitory computer readable storage medium, wherein the non-transitory computer readable storage medium comprises instructions executable by a processor to perform the above functions. In certain embodiments, the server may comprise the means for performing the steps described above and supported by the disclosure herein. In one embodiment, the server may be a crowdsourcing server.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
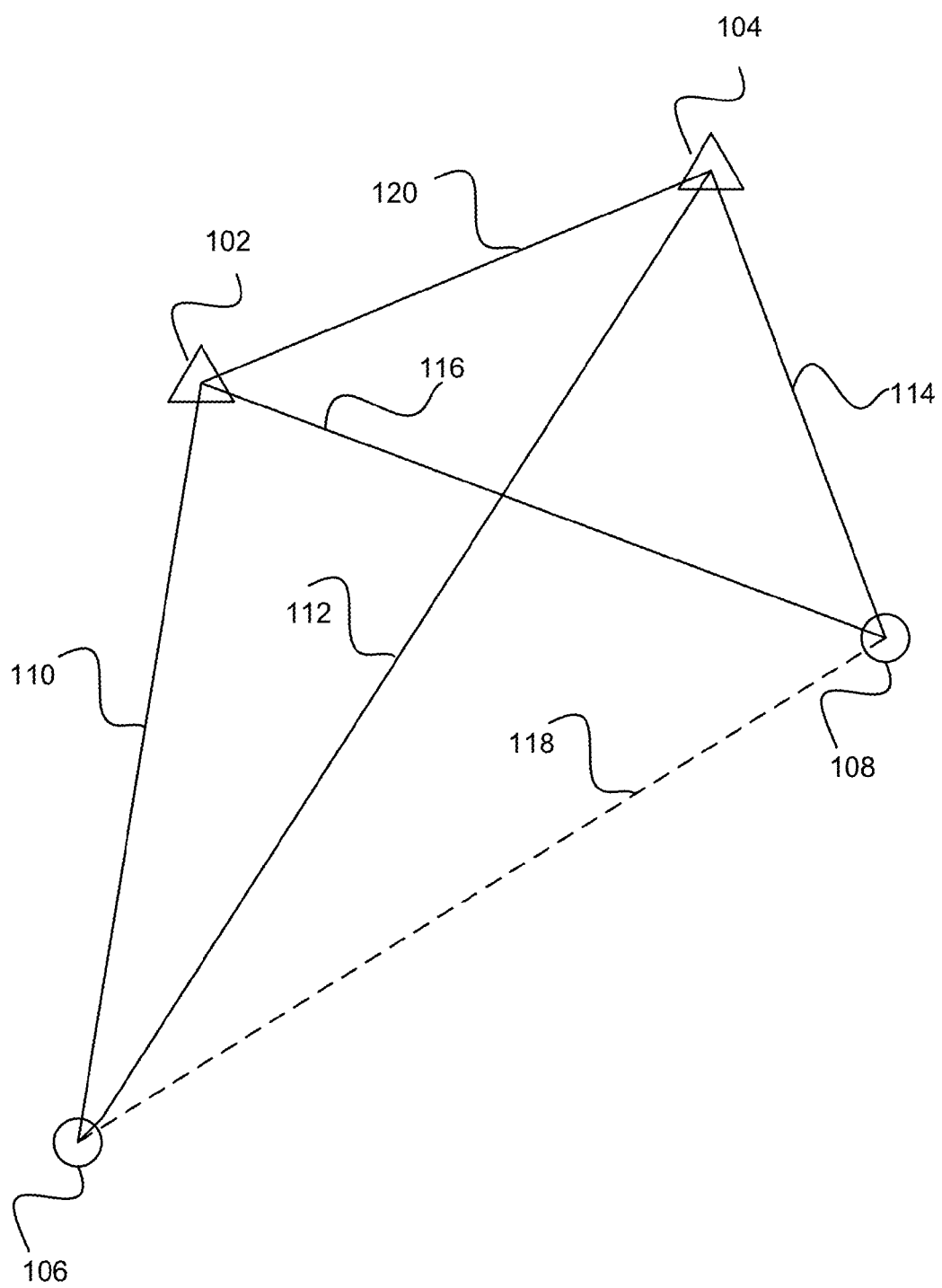
FIG. 1 depicts an exemplary setting for determining the relative positioning of the access points using a device.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The word "exemplary" is used herein to mean "serving as an example, instance, or illustration." Any embodiment or design described herein as "exemplary" is not necessarily to be construed as preferred or advantageous over other embodiments or designs.

The present disclosure may refer to an "AP," or access point. Generally, an AP is a source where wireless communications may be transmitted and received and are connected to a larger communications network, such as the Internet or LAN. An example device acting as an AP may be a wireless router or a telecommunications base station. In one embodiment, an AP may be implemented using one or more components described in FIG. 13.

The present disclosure may refer to "crowd-sourcing," which is generally defined as gathering data or information or helping to solve a quantitative or computationally intensive problem using multiple people, i.e. a "crowd." Aspects of the disclosure may use crowd-sourcing more specifically in reference to obtaining the locations or electrical characteristics of wireless access points ("APs") using information obtained through multiple people in a pro-active mode, where the user has to intervene for the data collection, or in a passive mode, where the user has no action to perform.

The present disclosure may refer to "war-driving" or "war-walking," which generally refer to the active act of driving or walking, respectively, around an area to find APs, as an example of crowd-sourcing.

The present disclosure may refer to "RSSI," or received signal strength indication. Generally, RSSI refers to the qualitative or quantitative strength of a wireless signal from an AP. The disclosure may refer to "RTT," or round trip time. RTT generally refers to the time any signal takes to travel from the source, to a designated destination, and back to the source. Aspects of the disclosure may focus mainly on the RTT of a communication signal from a remote device, such as a mobile device, to an AP and back, or vice versa. An example signal measuring RTT may be a ping signal.

The present disclosure may refer to "TCF," or turnaround calibration factor. Generally, TCF refers to the turn-around time of an AP between reception of a packet and retransmission of a response packet. In one example, the TCF for an access point is associated with the receiving and processing time associated with a request from a device.

The present disclosure may refer to "heatmaps," which are generally defined as a mapping of a particular characteristic over a two- or three- dimensional space, expressed as a qualitative or quantitative value per unit space. An example of a heatmap may be a visual graph showing varying weather temperatures over a metropolitan area, with different bands of colors illustrating different temperatures around the metropolitan area. Aspects of the disclosure may focus on heatmaps showing relative wireless signal strength of APs, or the AP RSSI. Persons with ordinary skill in the art may imagine, for example, a heatmap of an AP to show stronger signal strength the closer in area one is to the AP, and weaker signal strength the farther away one is from the AP, while the exact mapping may vary due to environmental and other factors. The disclosure may refer to "fingerprints," which in this case may refer synonymously to heatmaps.

The present disclosure may refer to "device," which may be interchangeably used with mobile device, wireless device, terminal, mobile terminal and user equipment (UE) without altering the scope of the invention. A device may refer to a mobile station such as a cellular or other wireless communication device, personal communication system (PCS) device, personal navigation device, Personal Information Manager (PIM), Personal Digital Assistant (PDA), laptop, tablet, tracking device or other suitable mobile device which is capable of receiving wireless communications. The term "device" is also intended to include devices which communicate with a personal navigation device (PND), such as by short-range wireless, infrared, wire line connection, or other connection—regardless of whether satellite signal reception, assistance data reception, and/or position-related processing occur at the device or at the PND. Also, a "device" may include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered as a "device." Furthermore, components of the computer system described in further detail with respect to FIG. 13 may be used in any operable combination to be considered as a "device."

Existing crowd-sourcing solutions primarily depend on RSSI and have several drawbacks, addressed by embodiments of the invention. The traditional system implemenations need active contribution by the user by loading and activating a crowd-sourcing application and is also very sensitive to mode of data collection. In many instances, the reported RSSI is variable depending on the capability of the device, such as antenna gain, antenna gain uniformity, etc. Additionally, the reported RSSI may be dependent upon the orientation, positioning and handling of the device by the user, and is dependent upon whether the user is in the line of sight with the AP or not. Furthermore, the traditional techniques are very sensitive to the ground truth references, such as surface observations and measurements of various properties of the features of the ground that may introduce user perspective subjectivity into the collected information and lead to inaccuracies. For instance, while using ground truth references, in one example, the further the device is from a wall or easily identifiable feature, the larger the uncertainty or inaccuracy in the measurement. The ground truth reference measurements are particularly sensitive in the middle of a large open space. The aggregation of such different data types from disparate techniques contributes to uncontrollable and inaccurate resulting data.

Although, embodiments of the invention may use both RTT and RSSI measurements, using RTT measurements, as described in embodiments of the invention below, may have several advantages over using RSSI measurements exclusively. For instance, for RTT, the round trip time of travel is largely independent of signal strength, whereas RSSI requires proper modeling for signal decay over time and distance. RTT measurements are independent of antenna orientation from device to device, whereas RSSI measurements are impacted by device to device differences. RTT is tolerant of large signal drops, around obstructions, that do not substantially alter the transmission path lengths, whereas RSSI measurements may have non consistent measurements from user to user due to user shadowing. For RTT, large indoor and outdoor spaces enhance ranging accuracy and resolution, whereas RSSI quickly loses ability to resolve distance beyond few tens of meters. In multipath-rich indoor environments, using RTT, may improve overall positioning results and significantly improve outlier accuracy. RTT may also be used for reverse positioning of the APs, since RTT is less sensitive to measurement sector angular sizes around APs than RSSI. RSSI needs measurements all around AP for correct centroid based solution.

Figure 10:
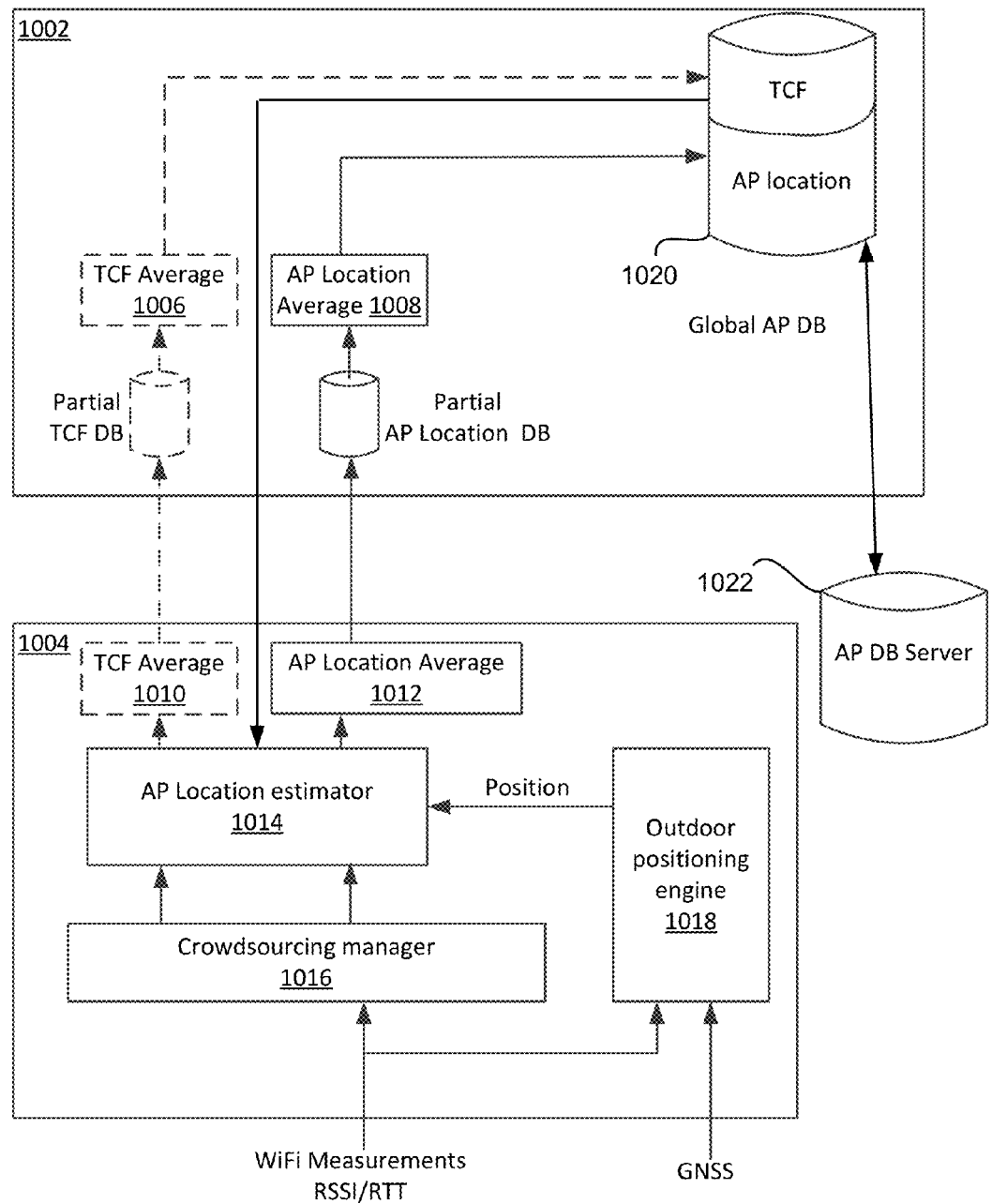
FIG. 10 is a block diagram depicting an exemplary implementation of the components of a device and the server for performing embodiments of the invention.
Figure 11:
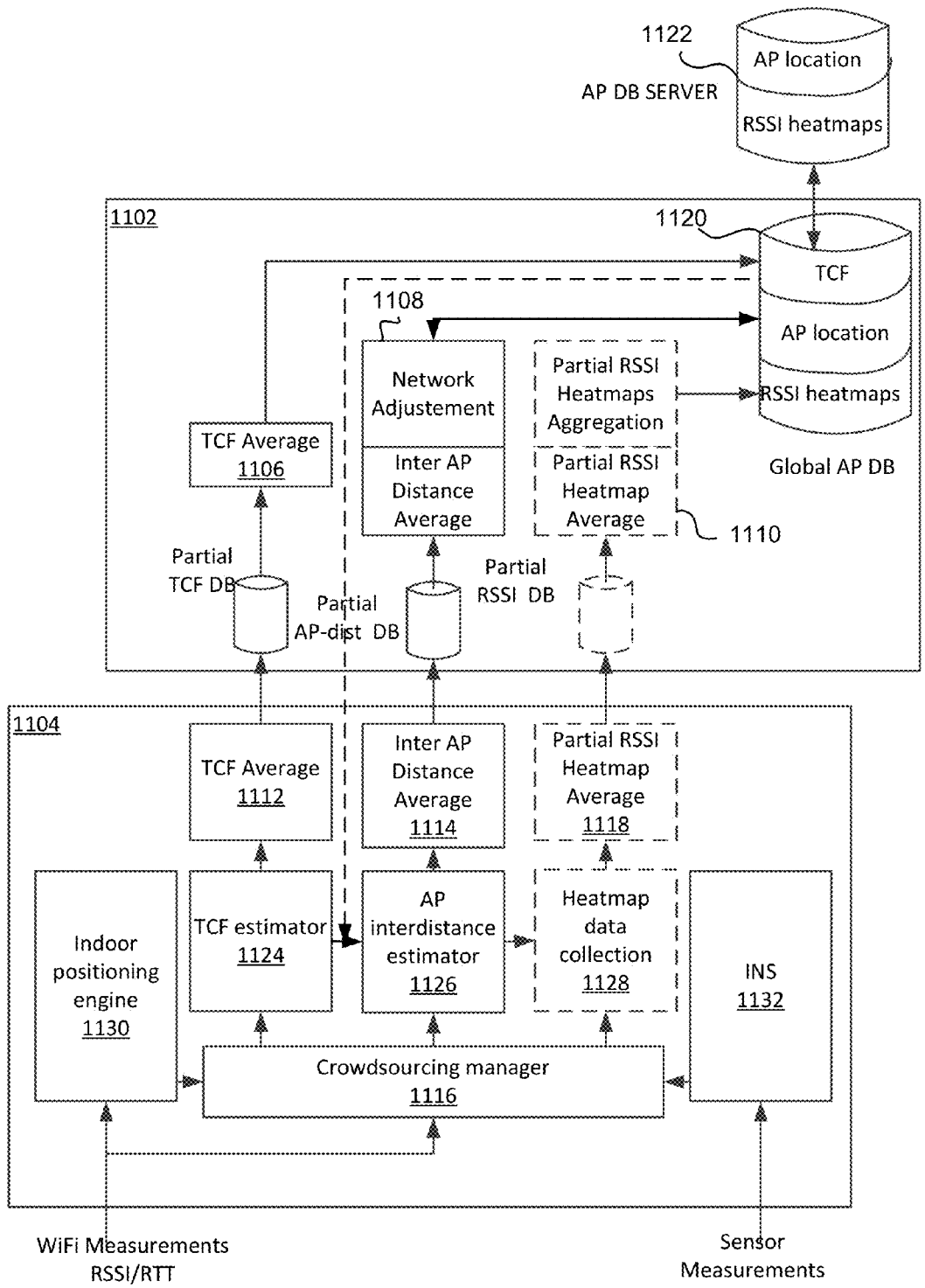
FIG. 11 is another block diagram depicting another exemplary implementation of the components of a device and the server for performing embodiments of the invention.
Figure 12:
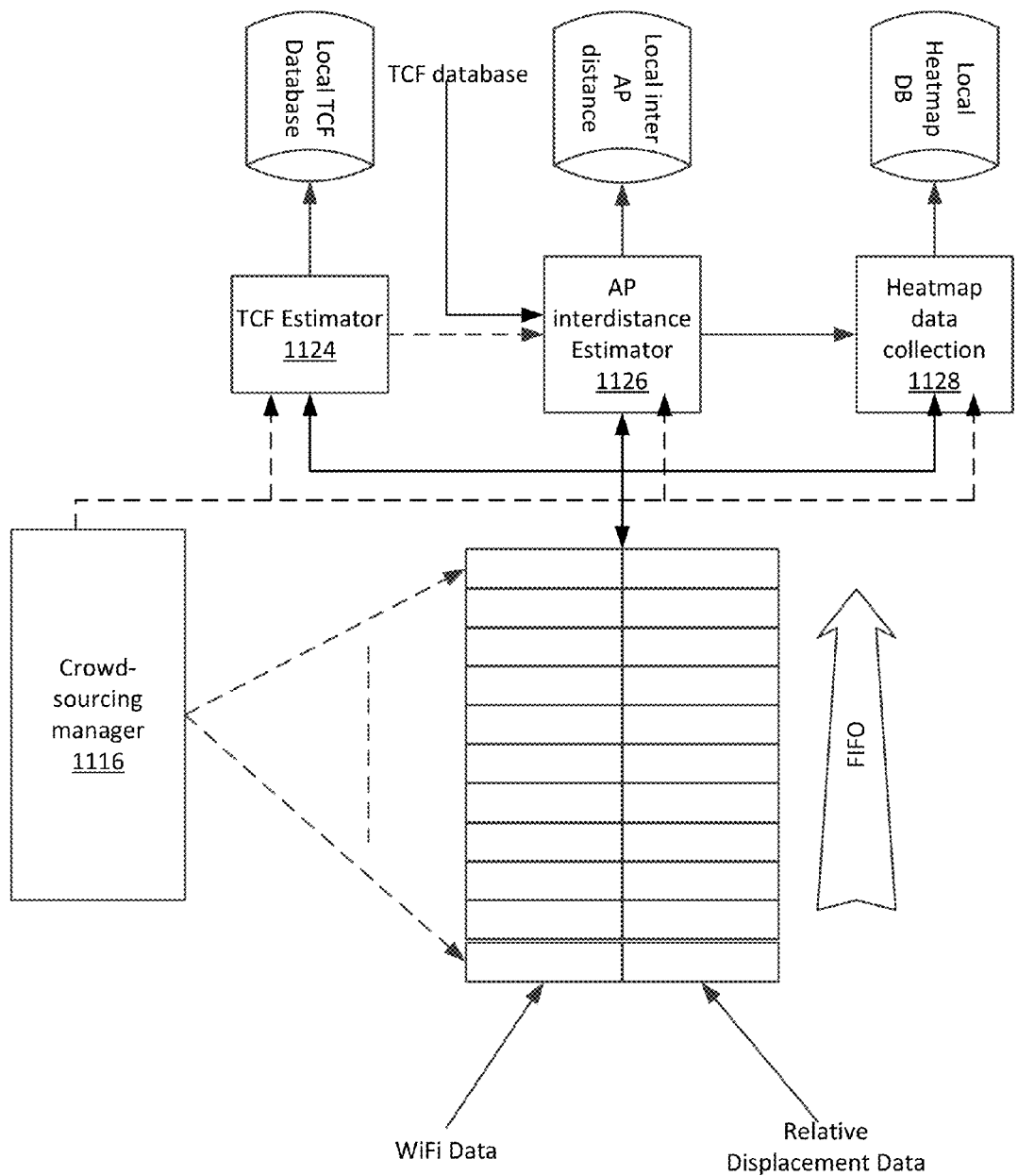
FIG. 12 is a block diagram depicting another exemplary implementation of the components of the device from FIG. 11 for performing embodiments of the invention.

One objective of the present disclosure is to propose a passive crowdsourcing method (no active participation of the user, besides the explicit agreement of data collection) that can be implemented in the background inside the positioning engine, shown in FIG. 10, FIG. 11 and FIG. 12 of a device, such as a mobile device. Additionally, the embodiments of the invention may not require or need map information or ground truth references. As discussed in further detail below, the device may also transmit preprocessed data to the server, such as the crowd-sourcing server reducing the amount of transmission and also the complexity and computing power required at the server.

Some embodiments include a computer-implemented method for determining a location of a first access point (AP). RSSI and RTT data may be collected by the device. In some implementations a dedicated Hardware/Firmware engine may be implemented in the device to provide distance-related measurements, such as RTT measurements. In some implementations, the pre-processed measurements may be transferred to a server, such as a crowd-sourcing server, for further processing and integration into heatmaps. The pre-processed data or "elements" of data may be assembled by the crowd-sourcing server, with no special knowledge of the characteristics of the device used for data collection. These elements may already be refined inside the device before transmitting to the server. These elements of data may include both, data for AP location determination and data for heatmap determination, as shown in FIG. 11. Some elements may be useful in determining both AP location and improving heatmaps.

In some embodiments, elements aggregated from different devices overtime, may be combined together to form an aggregated network of APs, and possibly geo-referenced if the absolute position of some of the APs are already known. In some implementations, the RSSI heatmap information may be collected for the relative coordinate system, in parallel, around a set of APs that are visible during the same period of time.

As discussed in greater detail in reference to the figures below, for such an implementation of crowdsourcing to be possible, the device may need to know the relative motion between several points of measure. This relative motion of the device may be caluculated using sensors, such as inertial sensors form an inertial navigation system (INS) or having another source of positioning at each point on the trajectory, such as GNSS data points. The absolute orientation of the displacement against the geographical or magnetic north may not be necessary, if the relative positions may be ascertained for the APs with a few APs with absolute locations.

Some embodiments may also include determining a heatmap of the first AP, based at least in part on the inter-distance measurement. A heatmap coordinate of the AP may be a local coordinate, expressed in terms relative to the inter-distance measurement. Alternatively, the heatmap coordinates may be expressed globally, and may be converted to global coordinates based on the relative coordinates.

Aspects of the disclosure, use multiple locations in determining the location of the AP and calculating the TCF associated with the AP. A first location may be differentiated from a second location using a distance threshold. For instance, a distance below a distance threshold may not be discernible by the device in some circumstances. Such threshold may be set using empirical data in one implementation. In another implementation, the device may train itself to determine the distance threshold based on two sources of distance calculations (such as RTT distance and GNSS distance). Yet other techniques may be used fix discerning a first location from a second location without departing from the scope of the invention.

FIG. 1 depicts an exemplary setting for determining the relative positioning of the access points using a device. FIG. 1 illustrates a scenario or setting for performing one or more embodiments or the invention. FIG. 1 depicts a first AP 102, a second AP 104 and a device at a first location 106 and a second location 108.

At the first location 106, the device obtains a first plurality of distance-related measurements associated with the first location 106. In one implementation, the first plurality of distance-related measurements includes a first distance-related measurement 110 between a device at the first location and a first AP and a second distance-related measurement 112 between the device at the first location and a second AP.

In one exemplary scenario, overtime, for example, a user handling the device may move from the first location 106 to the second location 108. The device may use one or more sensors 1355 to derive location information for deriving the distance 118 between the first location 106 and the second location 108. For instance, in one implementation, the device may use a pedometer to determine the distance travelled by the user. In addition, or in alternative, the device may use inertial sensors, such as gyroscopes, accelerometers or magnetometers to facilitate in the calculation of the distance 118 between the first location 106 and the second location 108. The inertial sensors may be part of an inertial navigation system (INS). In yet another implementation, the device may use location information received from a Global Navigation Satellite System (GNSS) in determining the distance 118 between the first location 106 and the second location 108.

At the second location 108, the device obtains a second plurality of distance-related measurements associated with the second location 108. In one implementation, the second plurality of distance-related measurements includes a third distance-related measurement 116 between the device at the second location 108 and the first AP and the fourth distance-related measurement 114 between the device at the second location 108 and the second AP 104.

In one embodiment, the device determines the inter-distance measurement 120 of the first AP 102 with respect to the second AP 104 using the first plurality of distance-related measurements, the second plurality of distance-related measurement and the location information associated with the movement of the device from the first location 106 to the second location 108.

In an alternate embodiment, the device transmits the first plurality of distance-related measurements, the second plurality of distance-related measurement and the location information associated with the movement of the device from the first location 106 to the second location 108 to a server, such as a crowd sourcing server, for further determination of the inter-distance measurement 120 between the first AP 102 and the second AP 104.

The device or the server, respectively, may determine the relative location of the first AP 102 compared to the second AP 104 using the inter-distance measurement 120 of the first AP 102 and the second AP 104.

In one implementation, the distance-related measurements may include round trip time (RTT) measurements. In another implementation, the distance-related measurements may include received signal strength indication (RSSI) measurements.

In some implementations, the device may also need the turnaround calibration factor (TCF) for more accurately determining the inter-distance measurement 120 more accurately. In one embodiment, the device may access the pre-determined TCF for an access point. In another embodiment, the device may determine the TCF for an access point as further discussed in more detail in FIG. 4, FIG. 5 and FIG. 6.

In one embodiment, the device may access the absolute location of one of the APs, for example the second AP 104. The device may determine the absolute location of the first AP 102, based at least in part on the absolute location of the second AP 104 and the inter-distance measurement 120 of the first AP 102 and the second AP 104.

Figure 2:
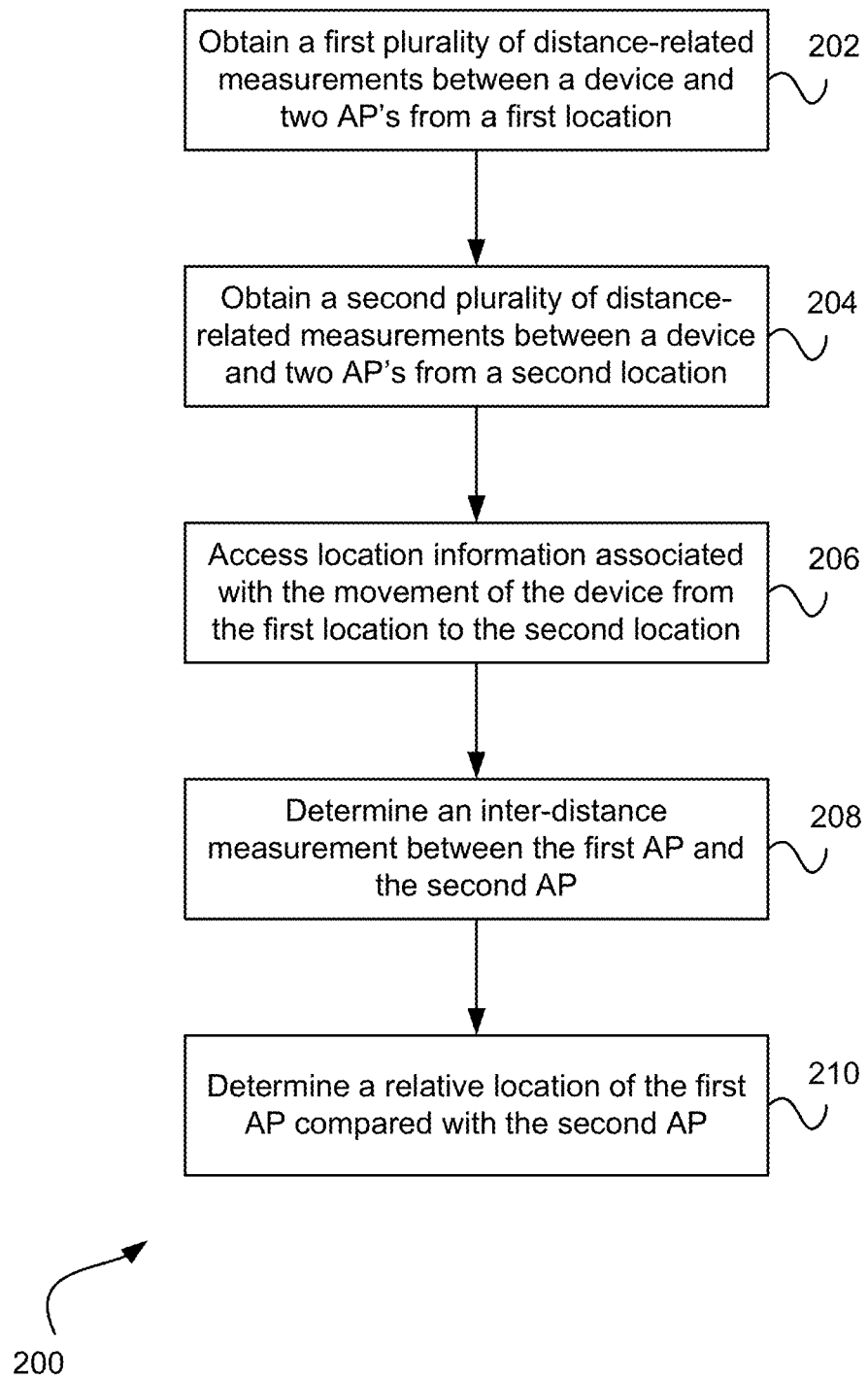
FIG. 2 is a flow diagram, illustrating a method for performing embodiments of the invention for determining the relative positioning of the access points using a device.

FIG. 2 is a flow diagram, illustrating a method for performing embodiments of the invention for determining the inter-distance measurement between APs. The signaling in method 200 is performed by processing logic that comprises hardware (circuitry, dedicated logic, etc.), software (such as is run on a general purpose computing system or a dedicated machine), firmware (embedded software), or any combination thereof. In one embodiment, the method 200 is performed by one or more computer systems 1300 as described in FIG. 13. In one embodiment, the receiving and transmitting steps described below may be facilitated utilizing the transceiver 1350 described in FIG. 13.

At Step 202, components of the device, such as the processor 1310 and the transceiver 1355, obtain or access a first plurality of distance-related measurements between the device and the two AP's from a first location 106. In one implementation, the first plurality of distance-related measurements includes a first distance-related measurement 110 between a device at the first location 106 and a first AP 102 and a second distance-related measurement 112 between the device at the first location 106 and the second AP 104.

At Step 204, components of the device, such as the processor 1310 and the transceiver 1355, obtain or access a second plurality of distance-related measurements between the device and the two AP's from a second location 108. In one implementation, the second plurality of distance-related measurements includes a third distance-related measurement 116 between the device at the second location 108 and a first AP 102 and a fourth distance-related measurement 114 between the device at the second location and the second AP 104.

At Step 206, components of the device, access location information associated with the movement of the device from the first location 106 to the second location 108. In one embodiment, components of the device, such as the processor calculates the distance using location information from one or more sensors 1355, such as pedometers, and/or inertial sensors.

At Step 208, components of the device performing embodiments of the invention, such as the processor 1310, determine an inter-distance measurement 120 of the first AP 102 and the second AP 104, based at least in part on the first plurality of distance-related measurements, the second plurality of distance-related measurement and the location information.

At Step 210, components of the device performing embodiments of the invention, such as the processor 1310, determine a relative location of the first AP compared with the second AP.

In one implementation, the distance-related measurements may include round trip time (RTT) measurements. In another implementation, the distance-related measurements may include received signal strength indication (RSSI) measurements.

In one embodiment, the device may access the absolute location of one of the APs, for example the second AP 104. The device may determine the absolute location of the first AP 102, based at least in part on the absolute location of the second AP 104 and the inter-distance measurement 120 of the first AP 102 and the second AP 104.

It should be appreciated that the specific steps illustrated in FIG. 2 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 200.

Figure 3:
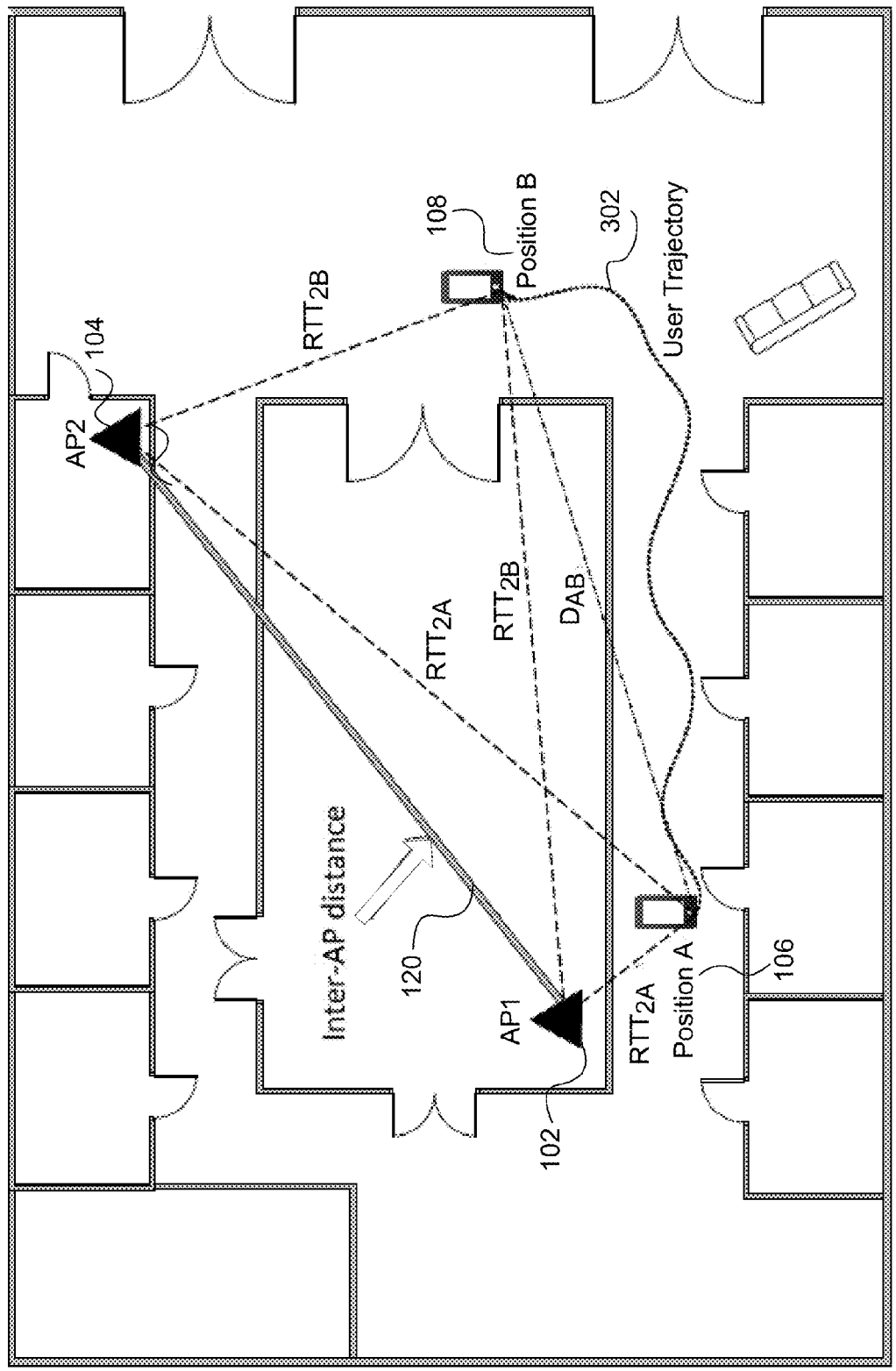
FIG. 3 depicts another exemplary setting for determining the relative positioning of the access points using a device.

FIG. 3 illustrates a similar configuration to FIG. 1, of two APs and one device, in an indoor setting. As shown in FIG. 3, the first AP 102 and the second AP 104 are located in separate rooms. The device associated with the user moves through the hallway with the user in the indoor location from a first location 106 (position A in FIG. 3) to second location 108 (position B in the FIG. 3) on the user trajectory 302. As described in FIG. 1 and FIG. 2, the device may determine the inter-distance measurement 120 between the first AP 102 and the second AP 104. The device may further determine the relative location of the first AP 102 compared with the second AP 104. If the device ascertains the absolute location of one of the two APs the device may also ascertain the absolute location of the second AP.

In one implementation, the device transmits all the distance-related measurements to a server for further calculations. In another implementation, the device calculates the inter-distance measurement 120 and transmits the measurement to the server. In yet another embodiment, the device also calculates the absolute location of the APs and sends it to the server. In one embodiment, the server is a crowd-sourcing server that accumulates location information for various APs from various devices for improving the location estimates and building out and improving heatmaps for the APs.

As discussed previously, in some implementations, the device may also need the turnaround calibration factor (TCF) for more accurately determining the inter-distance measurement 120 more accurately. Generally, TCF refers to the turn-around time of an AP between reception of a packet and retransmission of a response packet. In one example, the TCF for an access point is associated with the receiving and processing time associated for a retransmission request from a device. Techniques for determining TCF information for an AP is discussed in further detail in FIG. 4, FIG. 5 and FIG. 6.

Figure 4:
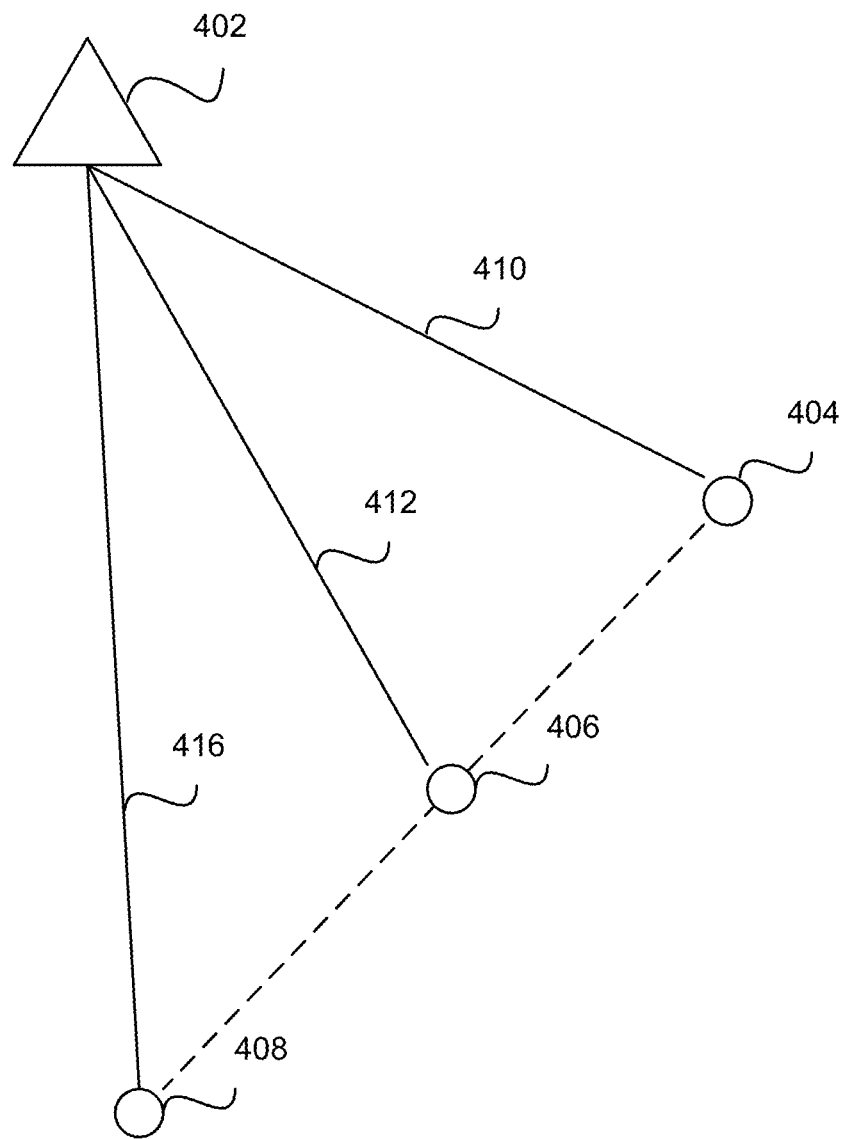
FIG. 4 depicts an exemplary configuration for determining a turnaround calibration factor (TCF) associated with an AP.

FIG. 4 depicts an exemplary configuration for determining a TCF associated with an AP. FIG. 4 shows a stationary AP 402 and a device that moves from a first location 408, to a second location 406 and then to a third location 404. In one implementation, the device obtains at least three distance-related measurements (416, 412 and 410) between the device and the AP 402, wherein each of the at least three distance-related measurements are obtained at different locations.

The device additionally obtains location information of the device each time one of the at least three distance-related measurements are obtained. For example, when the user of the device moves from the first location 408 to the second location 406, in one embodiment, the device may locally calculate the distance travelled using sensors 1355, such as pedometers or inertial sensors. In one implementation, the device may use information received from a GNSS system in determining the distance between the first location 408 and the second location 406.

The device may determine the TCF of the AP 402, based at least in part on the at least three distance-related measurements and the movement information of the device obtained during each time the at least three distance-related measurements are obtained. In some embodiments, the TCF is transmitted by the device to the server so that other devices may be able to use the pre-calculated TCF of the AP.

Figure 5:
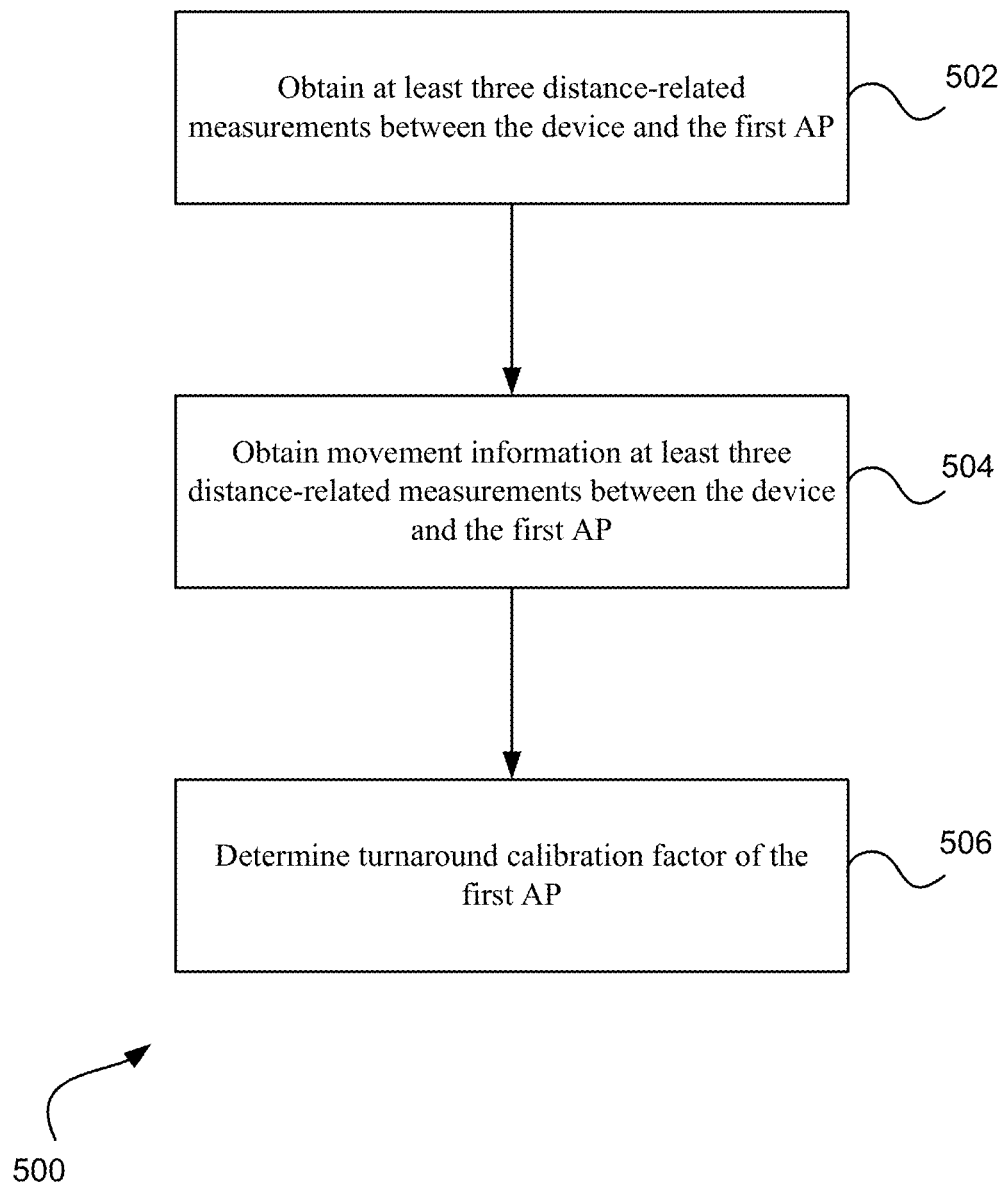
FIG. 5 is a flow diagram, illustrating a method for performing embodiments of the invention for determining the TCF for an AP.

FIG. 5 is a flow diagram, illustrating a method for performing embodiments of the invention for determining the turnaround calibration factor (TCF) for an AP. The signaling in method 500 is performed by processing logic that comprises hardware (circuitry, dedicated logic, etc.), software (such as is run on a general purpose computing system or a dedicated machine), firmware (embedded software), or any combination thereof. In one embodiment, the method 500 is performed by one or more computer systems 1300 as described in FIG. 13. In one embodiment, the receiving and transmitting steps described below may be facilitated utilizing the transceiver 1350 described in FIG. 13.

At Step 502, components of the invention, such as the processor 1310 and the transceiver 1355, obtain at least three distance-related measurements between the device and the AP 402, wherein each of the at least three distance-related measurements are obtained at different locations.

At Step 504, components of the invention, such as the processor 1310 obtain TCF-related location information of the device each time one of the at least three distance-related measurements are obtained. In one embodiment, the TCF-related location information is calculated locally at the device using information received from sensors 1355 on the device. The location information may be used in determining the distance between the locations, as the device is relocated from the first location 408 to the second location 406 and then to the third location 404.

At Step 506, components of the invention, such as the processor 1310, determine the TCF of the AP 402, based at least in part on the at least three distance-related measurements and the TCF-related location information of the device obtained during each time the at least three distance-related measurements are obtained.

It should be appreciated that the specific steps illustrated in FIG. 5 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 500.

Figure 6:
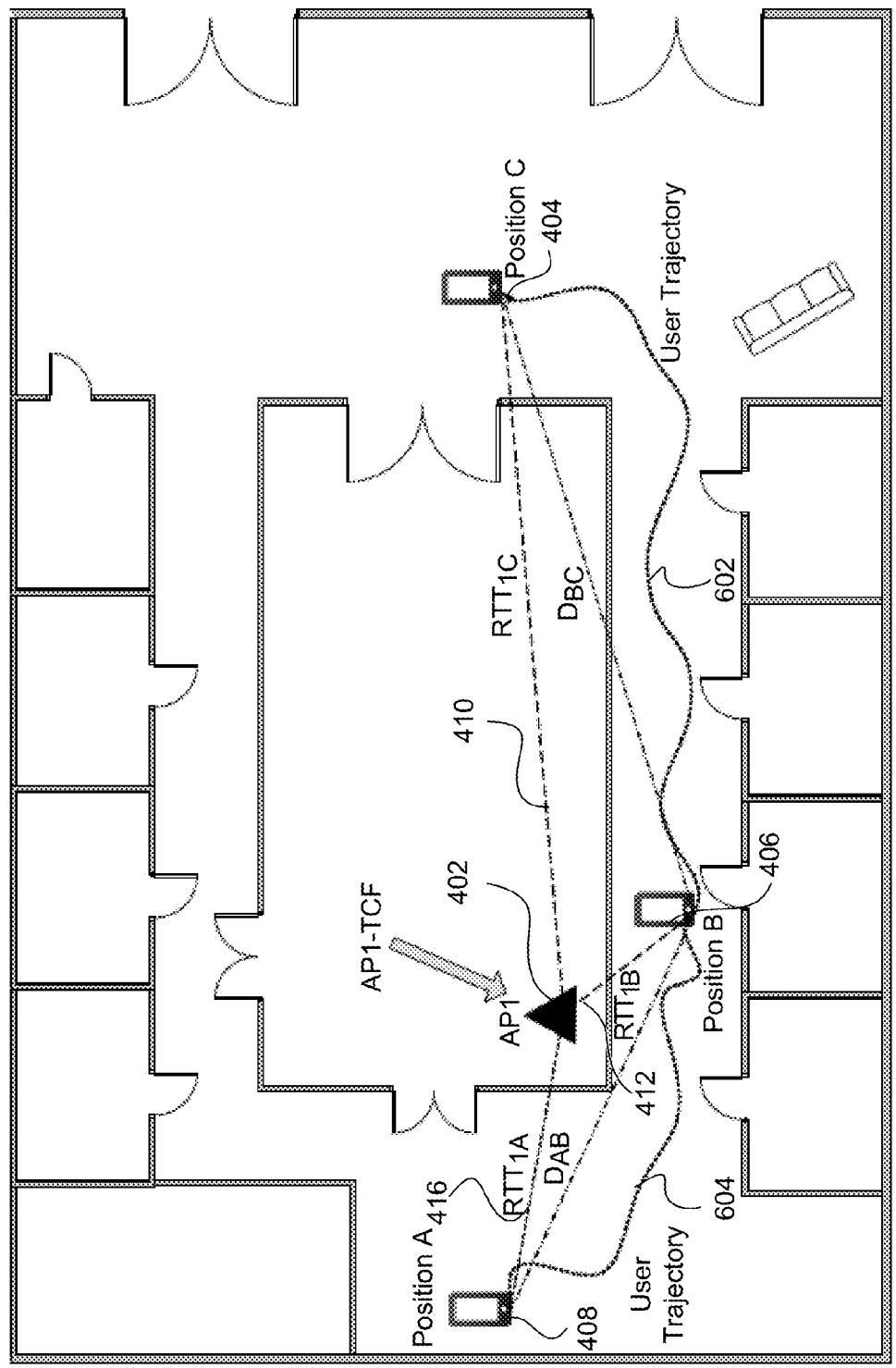
FIG. 6 depicts another exemplary configuration for determining a TCF associated with an AP.

FIG. 6 illustrates a similar configuration to FIG. 4, of one AP 402 and one device, but in an indoor setting. As shown in FIG. 6, the AP 402 is stationary and located in the central room. The user of the device moves along the hallway of the indoor location with the device from a first location 408 (position A in FIG. 6), to a second location 406 (position B in FIG. 6) to then a third location 404 (Position C in FIG. 6). The device obtain at least three distance-related measurements between the device and the AP 402, wherein each of the at least three distance-related measurements are obtained at different locations. The device further accesses location information associated with the movement of the device from one location to another. As the user moves along the trajectory 602 and 604, the device may collect location information using sensors 1355 to determine the distance between each location. As described in FIG. 4 and FIG. 5, the device may determine the TCF for the AP 402 based at least in part on the at least three distance-related measurements and the TCF-related location information of the device obtained during each time the at least three distance-related measurements are obtained.

Figure 7:
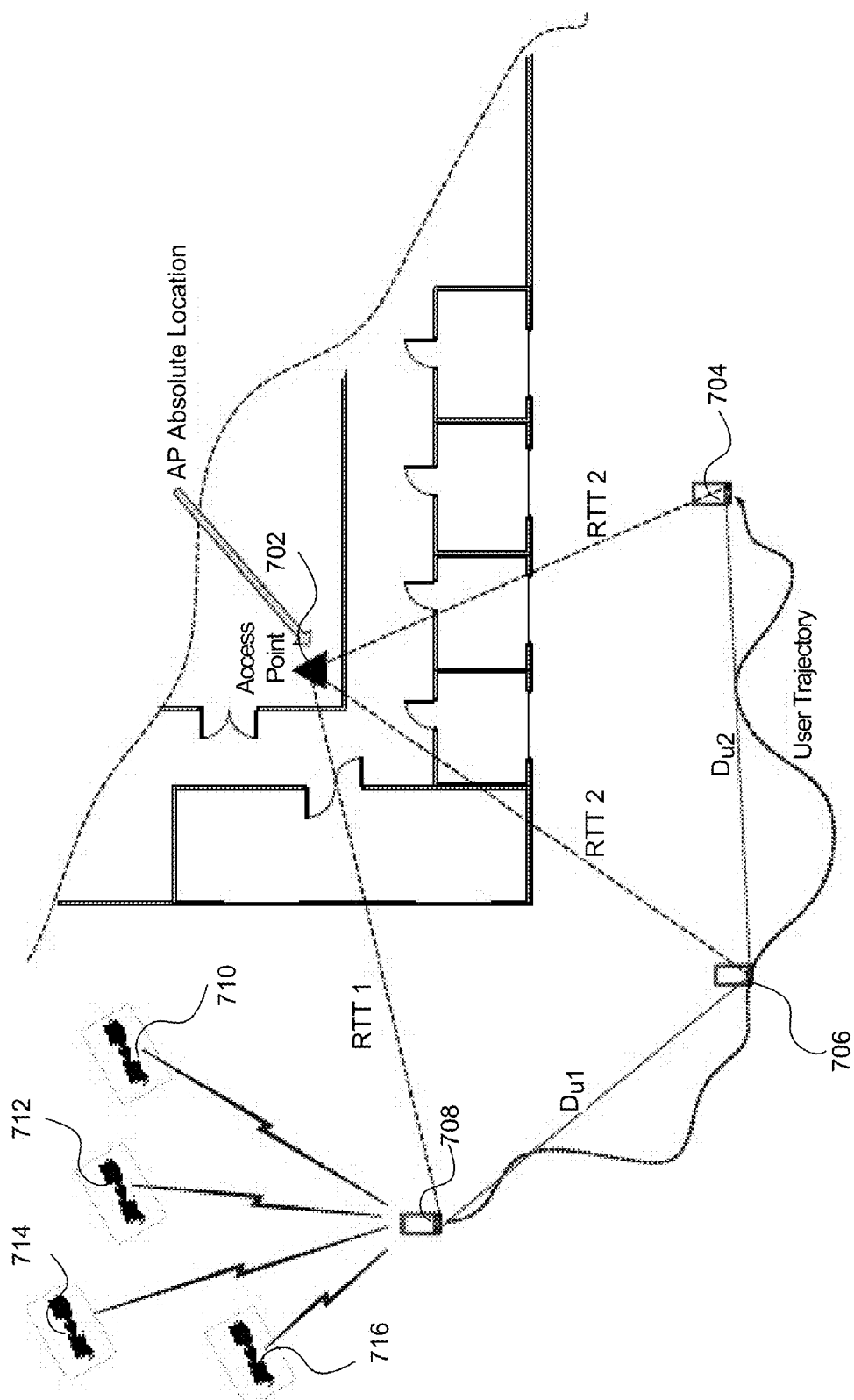
FIG. 7 depicts an exemplary configuration for determining the absolute location of an AP.

FIG. 7 also illustrates a similar configuration to FIG. 4, of one AP 702 and one device. However, in FIG. 7, the AP 702 is indoors, whereas the device is outdoors and has visibility to a GNSS system at third location 708. Embodiments of the invention, as described in FIG. 7 may be used for AP reverse positioning, where three non-collocated locations of the device may be used to resolve the absolute location of the AP, where at least the absolute location of one of the locations of the device may be ascertained.

As shown in FIG. 7, the user moves from a first location 704 to a second location 706 and then to a third location 708 with the device. At each location, the device obtains distance-related measurements between the AP 702 and the device. In addition to the distance-related measurements, the device also accesses location information associated with the movement of the device between the three locations (704, 706 and 708). In one embodiment, the device uses the location information associated with the movement of the device between the three locations to determine the relative distance between the three locations (704, 706 and 708). The device may use the distance-related measurements between the device at each location and the AP 702 and the relative distance between each location (704, 706 and 708) to determine the relative location of the AP 702 with respect to the device.

In one embodiment, since the device is outside, the device may be exposed to sufficient number of GNSS satellites (710, 712, 714 and 716) at location 708 to determine its absolute location using known techniques in GNSS technology. The device may use the absolute location of the device and the relative location of the AP 702 to the device to determine the absolute location of the AP 702. Embodiments of the invention may use known techniques, such as trilateration algorithm, minimum mean square error and Taylor expansion based iterative algorithms for resolving the absolute location of the AP 702.

Figure 8:
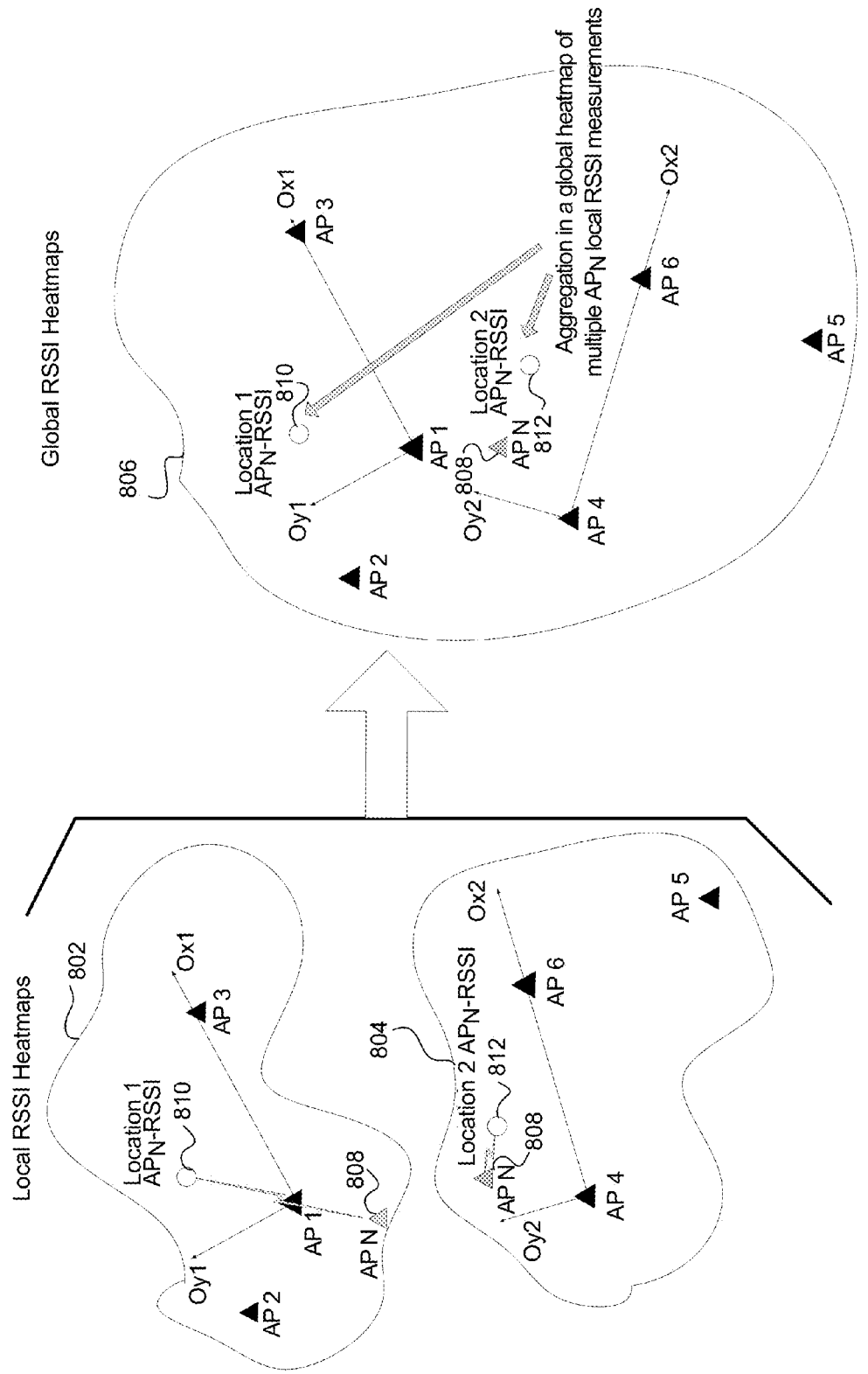
FIG. 8A and FIG. 8B depict exemplary heatmaps used in embodiments of the invention.

FIG. 8A depicts exemplary heatmaps used in embodiments of the invention. Heatmap 802 and heatmap 804 are local RSSI heatmaps. In heatmap 802, device at location 810 ascertains the absolute location of AP N-808, using embodiments of the invention as discussed in figures above. Similarly, in heatmap 804, device at location 812 ascertains the absolute location of AP N-808 using embodiments of the invention.

The device at location 810 and the device at location 812 may transmit the determined absolute location of AP N-808 to the server, such as a crowd-server shown in FIG. 11. In an alternate embodiment, the device at each location sends enough information to a server, such as a crowd-sourcing server for determining the location of the AP N-808. In one embodiment, the crowd-server may improve the absolute location information for AP N-808 using information from device at location 810 and location 812. In one embodiment, the server determines that the AP N-808 from heatmap 802 and AP N-808 from heatmap 804 are the same AP based on the absolute location of the AP. In one implementation, the server may merge the local heatmap 802 and 804 into global RSSI heatmap 806, as shown in FIG. 8B.

Figure 9:
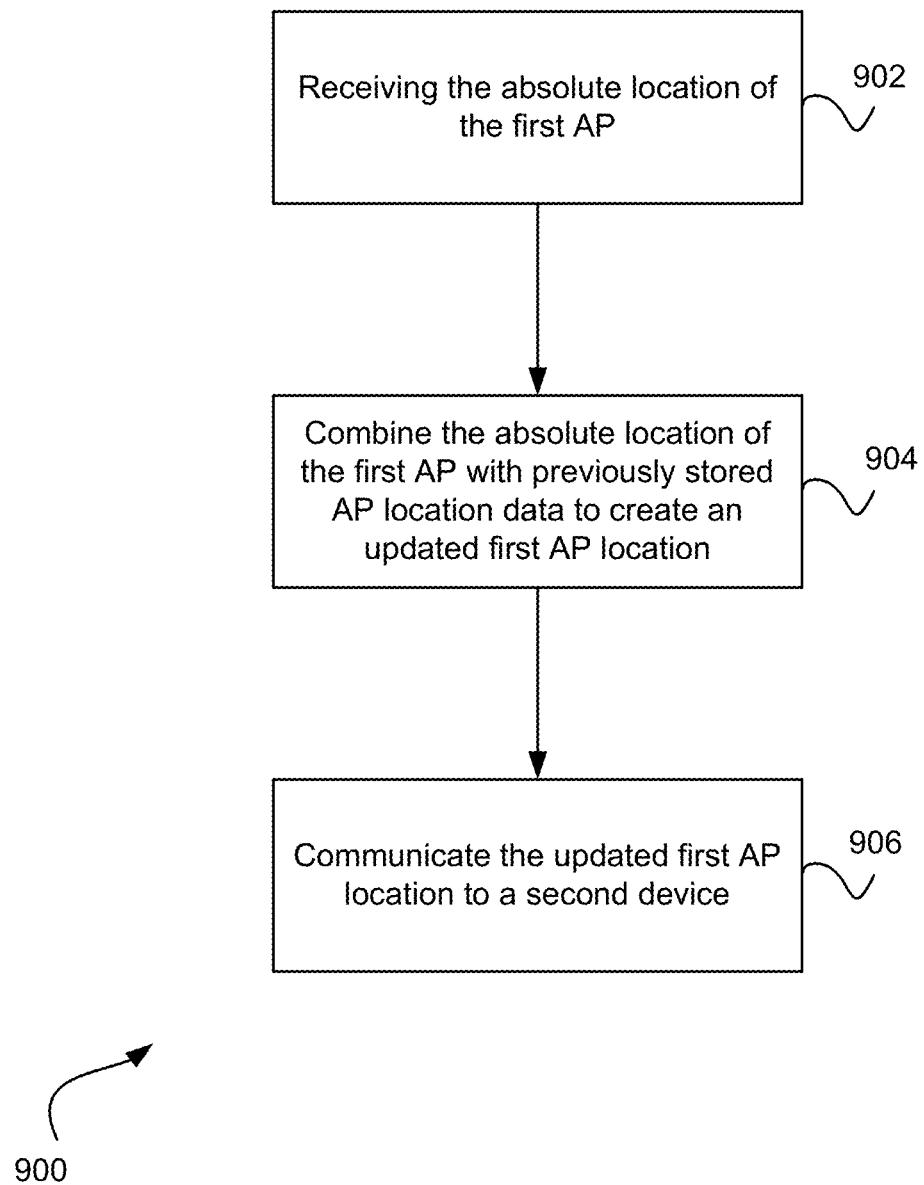
FIG. 9 is a flow diagram, illustrating a method for performing embodiments of the invention for crowdsourcing.

FIG. 9 is a flow diagram, illustrating a method for performing embodiments of the invention for crowdsourcing. The signaling in method 900 is performed by processing logic that comprises hardware (circuitry, dedicated logic, etc.), software (such as is run on a general purpose computing system or a dedicated machine), firmware (embedded software), or any combination thereof. In one embodiment, the method 900 is performed by one or more computer systems 1300 as described in FIG. 13. In one embodiment, the receiving and transmitting steps described below may be facilitated utilizing the transceiver 1350 described in FIG. 13.

Embodiments of the invention may be used for crowdsourcing, such that the absolute and refined AP location over multiple iterations from multiple devices is shared with participating devices, so that the device may ascertain the location of the APs. At Step 902, components of the invention, such as the transceiver 1355, receives the absolute location of the first AP.

At Step 904, components of the invention, such as the processor 1310, combines the absolute location of the first AP with previously stored AP location data to create an updated first AP location. The multiple determinations of the absolute location of the first AP may be received from the same device or multiple devices over a period of time.

At Step 906, components of the invention, such as the transceiver 1350, communicates the updated first AP location to a second device. In some embodiments, the updated first AP location is provided to the second device as part of assistance data or an updated heatmap with embedded data. In one use case, the user of the second device may use the updated first AP location for finding and accessing services by the AP.

It should be appreciated that the specific steps illustrated in FIG. 9 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 900.

FIG. 10 is a block diagram depicting an exemplary implementation of the components of a device 1004 and the server 1002 for performing embodiments of the invention. In one embodiment, the server 1002 is a crowd-sourcing server. One or more devices 1004 may be wirelessly connected to the server for transmitting and receiving information from the server. Both, the server 1002 and the one or more devices 1004, may be implemented using one or more components, described in further detail in FIG. 13. The modules shown in FIG. 10 may be implemented in software, firmware or hardware or some operable combination thereof. In one implementation, the implementation may be application and OS independent.

The device 1004 may implement a crowd-sourcing manager 1016 to manage crowd-sourcing functionality on the device and may act as an interface for receiving distance-related measurements using RSSI or RTT techniques. In one implementation, the crowd-sourcing manager 1016 calculates the various distances using the distance-related measurements using RSSI or RTT, or any other suitable means, at the various locations and transfers the information to the AP location estimator 1014. In another implementation, the crowd-sourcing manager 1016 may directly provide the AP location estimator 1014 with the distance-related measurements for further processing.

The outdoor positioning engine 1018 receives GNSS input and/or RTT and RSSI measurements. The outdoor positioning engine 1018 may use these inputs in determining the location of the device and provide the information to the AP location estimator 1014. The AP location estimator 1014 calculates the location of a particular AP using information from the crowd-sourcing manager 1016 and the outdoor positioning engine 1018. In one implementation the AP location estimator 1014 calculates the relative position of the AP. In another implementation the AP location estimator 1014 calculates the absolute location of the AP. The AP location estimator 1014 provides the AP location estimate for the AP to the AP location average module 1012. The AP location average module 1012 may average a plurality of AP location estimates for a particular AP, thus refining and improving the AP location estimates before transmitting the AP location estimate to the server 1002.

The AP location estimator 1014 may also determine the TCF for the AP, using techniques discussed in FIG. 4, FIG. 5 and FIG. 6. Similar to the AP location average module 1012, the TCF average 1010 module may also average the TCF calculations associated with a specific AP to refine and improve the TCF calculations before transmitting the TCF estimate to the server 1002.

The server 1002 may also temporarily store partial AP location information. The AP location average module 1008 at the server 1002 may also average a number of AP location calculations for the same AP received from the same device or various different devices to further refine and improve the AP location estimate. Similarly, the server 1002 may temporarily store partial TCF information. The TCF average module 1006 at the server 1002 may also average a number of TCF calculations for the same AP received from the same device or various different devices to further refine and improve the TCF estimate associated with an AP.

The TCF information and the AP location information may be stored in a global AP database 1020 at the server 1002. In some implementations, the contents of the global AP database may be shared with an external AP database server 1022 for various purposes, such as backing up the data and generating heatmaps.

FIG. 11 is a block diagram depicting another exemplary implementation of the components of a device 1104 and the server 1102 for performing embodiments of the invention. In one embodiment, the server 1002 is a crowd-sourcing server. One or more devices 1104 may be wirelessly connect to the server for transmitting and receiving information from the server. Both, the server 1102 and the one or more devices 1104, may be implemented using one or more components described in further detail in FIG. 13. The modules shown in FIG. 11 may be implemented in software, firmware or hardware or some combination thereof. In one implementation, the implementation may be application and OS independent. The implementation described in FIG. 11 may be well suited for an indoor wireless crowd-sourcing system and may work in conjunction with an outdoor wireless crowd-sourcing system sharing components of the design.

The device 1104 may implement a crowd-sourcing manager 1116 to manage crowd-sourcing functionality on the device and may act as an interface for receiving distance-related measurements using RSSI or RTT. In one implementation, the crowd-sourcing manager 1116 calculates the various distances using the distance-related measurements using RSSI or RTT, or any other suitable means, at the various locations. The crowd-sourcing manager 1116 may also receive indoor positing information from the indoor positioning engine 1130 and additional location information from the inertial navigation system 1132 (INS). The indoor positioning engine 1130 may receive RSSI or RTT measurements and determine indoor positioning information, such as relative distances using this RSSI/RTT information. The INS 1132 may receive information from sensors 1355, such as gyroscopes, accelerometers and magnetometers and provide location information to the crowd-sourcing manager for determining the distances between the various locations for the device. The crowd-sourcing manager 1116 transfers the information to the TCF estimator 1124, the AP interdistance estimator 1126 and optionally the heatmap data collector 1128. In another implementation, the crowd-sourcing manager 1016 may directly provide the AP location estimator 1014 with the distance-related measurements for further processing.

The TCF estimator 1124 also determine the TCF for one or more APs, using techniques discussed in FIG. 4, FIG. 5 and FIG. 6 and transfers the estimate to the TCF average module 1112. The TCF average module 1112 may average the TCF calculations associated with a specific AP to refine and improve the TCF calculations before transmitting the TCF estimate to the server 1102.

The AP interdistance estimator 1126 calculates the interdistance between two APs as discussed in FIG. 1, FIG. 2 and FIG. 3. In one implementation, the interdistance estimator 1126 may use TCF estimates from the TCF estimator 1124 in determining the interdistance between two APs. In another implementation, as shown in FIG. 11, the interdistance estimator 1126 may use TCF estimates from the server 1102 stored at the global AP database 1120. The inter AP distance average 1114 module may average the inter-distance calculations between any two APs to improve the results overtime and transmit out the averaged inter-distance calculations to the server 1102.

The device 1104 may optionally also implement a heatmap data collection 1128 module. As groupings of device movements and APs are obtained from the AP interdistance estimator 1126, the heatmap data collection 1128 module may start populating local maps. The partial RSSI heatmap average module 1118 may average the partial RSSI heatmap averages to improve the information and send the information to the server 1102.

The server 1002, may also temporarily store partial TCF data, partial AP-distance data and partial RSSI DB from one or more devices 1004, before averaging the information from the one or more devices at TCF average 1106 module, inter AP distance average 1108 module and rartial RSSI heatmap average 1110 module, respectively.

The TCF average 1106 module stores the refined TCF estimate in the global AP database 1120. At block 1108, the server 1102 may perform further network adjustments to compensate for the network architecture and store the inter AP distance average in the global AP database 1120. At block 1110, the server 1102 may optionally, aggregate the partial RSSI heatmaps, as discussed in FIG. 8A and FIG. 8B and store the heatmap in the Global AP database 1120. The AP location average module 1108 at the server 1102 may also average a number of AP location calculations for the same AP received from the same device or various different devices to further refine and improve the AP location estimate. Similarly, the server 1102 may temporarily store partial TCF information. The TCF average module 1106 at the server 1102 may also average a number of TCF calculations for the same AP received from the same device or various different devices to further refine and improve the TCF estimate associated with an AP.

In some implementations, the contents of the global AP database may be shared with an external AP database server 1122 for various purposes, such as backing up the data and generating heatmaps.

FIG. 12 is a block diagram depicting another exemplary implementation of the components of a device 1104 from FIG. 11 for performing embodiments of the invention. In an indoor WiFi crowd-sourcing system a single queue, such as a first in first out (FIFO) queue may be implemented to keep WiFi measurements. The depth of the queue may be adjustable. In one implementation, the depth of the queue may be measured in time. The data may be stored in pairs of WiFi data and relative displacement data. As discussed earlier, embodiments of the invention may be used for locally processing data at the device 1104, by first computing the TCF of the various APs using 3 or more measuring locations for each AP, as discussed in FIG. 4, FIG. 5 and FIG. 6 or obtaining the TCF measurements from the server 1102. Secondly, calculating the inter-AP distance computation, if TCF for two APs is available and two APs measurements are available at two distinct locations. Thirdly, locating the RSSI measurements in the relative coordinates versus APs, if the inter-AP distances are available.

Embodiments of the invention, implemented as described above, may be advantageous. The locations of the APs are refined from relative locations to absolute locations and then augmented with multiple matches from possibly multiple devices to provide very high positioning accuracy for the APs. The absolute locations of the APs may also be used to increase the accuracy and correct RSSI heatmaps. Furthermore, embodiments of the invention may be beneficial in allowing the information associated with the RSSI heatmaps to dynamically evolve, correct an increase in accuracy overtime. For instance, if a location of an AP changes, the RTT capability of an AP, such as the TCF of an AP changes, the heatmaps generated by the servers may adapt to these changes as new information is received.

Figure 13:
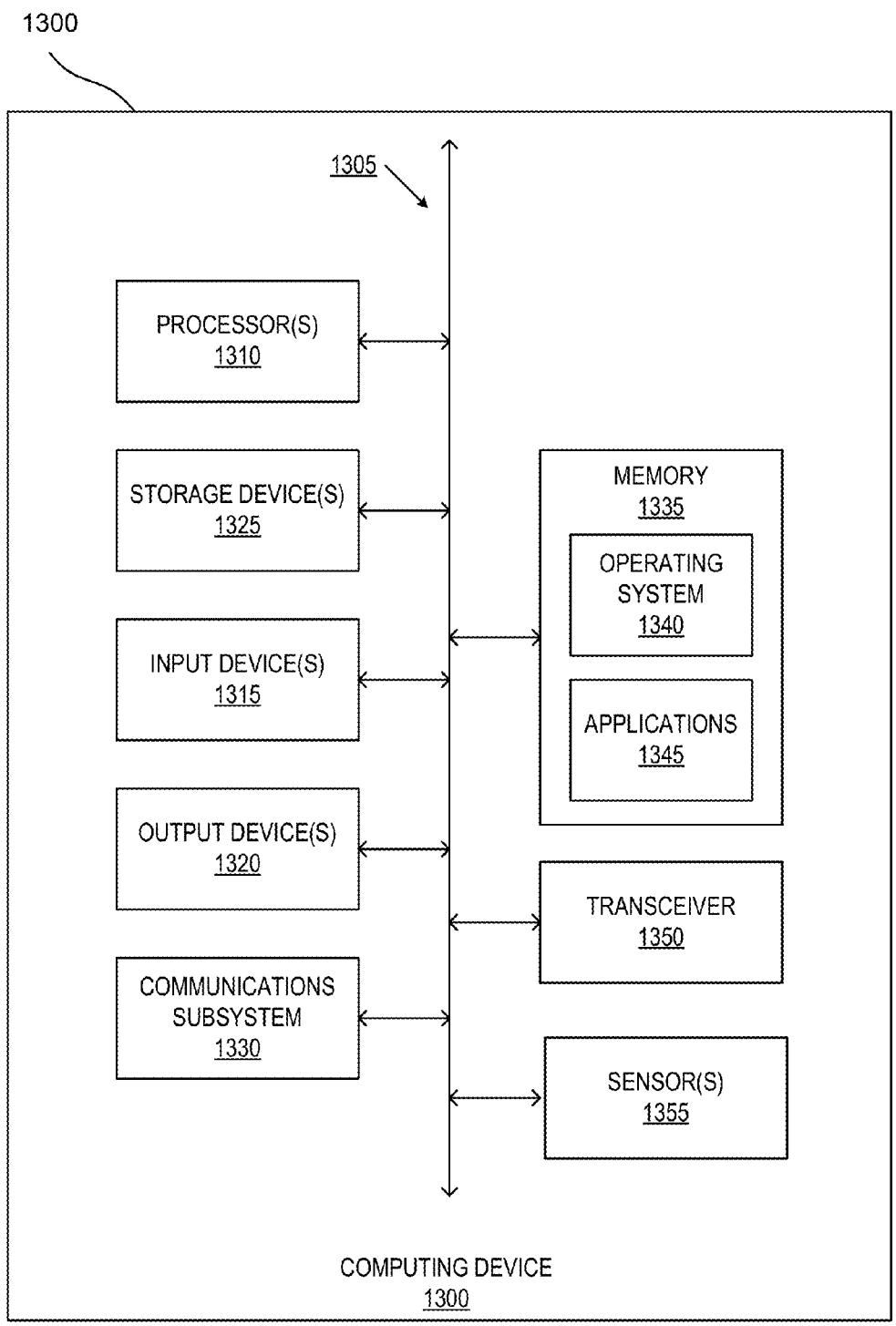
FIG. 13 illustrates an example of a computing device in which one or more embodiments may be implemented.

Having described multiple aspects of the crowd-sourcing architecture using RTT-based methods, an example of a computing system in which various aspects of the disclosure may be implemented may now be described with respect to FIG. 13. According to one or more aspects, a computer system as illustrated in FIG. 13 may be incorporated as part of a computing device, which may implement, perform, and/or execute any and/or all of the features, methods, and/or method steps described herein. For example, computer system 1000 may represent some of the components of a device and/or access point apparatus. A device may be any computing device with a wireless unit, such as an RF receiver. Examples of a mobile device include but are not limited to smartphones, GPS devices, tablets, survey equipment, and related computer systems and software. In one embodiment, the system 1300 is configured to implement any of the methods described herein. FIG. 13 provides a schematic illustration of one embodiment of a computer system 1300 that can perform the methods provided by various other embodiments, as described herein, and/or can function as the host computer system, a remote kiosk/terminal, a point-of-sale device, a mobile device, a set-top box, and/or a computer system. FIG. 13 is meant only to provide a generalized illustration of various components, any and/or all of which may be utilized as appropriate. FIG. 13, therefore, broadly illustrates how individual system elements may be implemented in a relatively separated or relatively more integrated manner.

The computer system 1300 is shown comprising hardware elements that can be electrically coupled via a bus 1305 (or may otherwise be in communication, as appropriate). The hardware elements may include one or more processors 1310, including without limitation one or more general-purpose processors and/or one or more special-purpose processors (such as digital signal processing chips, graphics acceleration processors, and/or the like); one or more input devices 1315, which can include without limitation a camera, a mouse, a keyboard and/or the like; and one or more output devices 1320, which can include without limitation a display unit, a printer and/or the like. The computing device 1300 may also include a sensor(s), such as inertial sensors or pedometers for facilitating calculating orientation and distance. Examples of sensors may include, but are not limited to, gyroscopes, accelerometers and magnetometers.

The computer system 1300 may further include (and/or be in communication with) one or more non-transitory storage devices 1325, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1300 might also include a communications subsystem 1330, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1330 may permit data to be exchanged with a network (such as the network described below, to name one example), other computer systems, and/or any other devices described herein. In many embodiments, the computer system 1300 may further comprise a non-transitory working memory 1335, which can include a RAM or ROM device, as described above. The computer system 1300 might also include a transceiver 1050 for facilitating communication by the communications subsystem 1330 with the external entities.

The computer system 1300 also can comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the method(s) discussed above, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1325 described above. In some cases, the storage medium might be incorporated within a computer system, such as computer system 1300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1300) to perform methods in accordance with the disclosure. For example, some or all of the procedures of the described methods may be performed by the computer system 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1300, various computer-readable media might be involved in providing instructions/code to processor(s) 1310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1325. Volatile media include, without limitation, dynamic memory, such as the working memory 1335. Transmission media include, without limitation, coaxial cables, copper wire and fiber optics, including the wires that comprise the bus 1305, as well as the various components of the communications subsystem 1330 (and/or the media by which the communications subsystem 1330 provides communication with other devices). Hence, transmission media can also take the form of waves (including without limitation radio, acoustic and/or light waves, such as those generated during radio-wave and infrared data communications).

Some embodiments may employ a computer system (such as the processor 1310) to perform methods in accordance with the disclosure. For example, some or all of the procedures of the described methods may be performed by the viewing apparatus in response to the processor executing one or more sequences of one or more instructions (which might be incorporated into an operating system and/or other code, such as an application program) contained in working memory. Such instructions may be read into the working memory from another computer-readable medium, such as one or more of the storage device(s). Merely by way of example, execution of the sequences of instructions contained in the working memory might cause the processor(s) to perform one or more procedures of the methods described herein.

Again, embodiments employing computer systems described herein are not limited to being physically connected to the viewing apparatus. Processing may occur in another apparatus, connected via wire or wirelessly to the viewing apparatus. For example, a processor in a phone or instructions for executing commands by a phone or tablet may be included in these descriptions. Similarly, a network in a remote location may house a processor and send data to the viewing apparatus.

The terms "machine-readable medium" and "computer-readable medium," as used herein, refer to any medium that participates in providing data that causes a machine to operate in a specific fashion. In an embodiment implemented using the processor 1310, various computer-readable media might be involved in providing instructions/code to processor(s) 1310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory, such as flash memory or DDR3 RAM. Transmission media include, without limitation, coaxial cables, copper wire and fiber optics, as well as the various components of a communications subsystem (and/or the media by which the communications subsystem provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A method for determining location of access points (AP), the method comprising:
   obtaining, at a mobile device, a first plurality of distance-related measurements associated with a first location, comprising at least a first distance-related measurement between the mobile device at the first location and a first AP and a second distance-related measurement between the mobile device at the first location and a second AP;
   obtaining, at the mobile device, a second plurality of distance-related measurements associated with a second location, comprising at least a third distance-related measurement between the mobile device at the second location and the first AP and a fourth distance-related measurement between the mobile device at the second location and the second AP;
   determining, at the mobile device, a relative change in location associated with a movement of the mobile device from the first location to the second location; and
   determining, by the mobile device, a relative location of the first AP compared with the second AP by determining an inter-distance measurement of the first AP and the second AP, based at least in part on the first plurality of distance-related measurements, the second plurality of distance-related measurements and the relative change in location.

2. The method of claim 1, further comprising:
   obtaining, at the mobile device, an absolute location of the second AP from a server or a Global Navigation Satellite System (GNSS);
   determining, by the mobile device, the absolute location of the first AP, based at least in part on the absolute location of the second AP and the inter-distance measurement of the first AP and the second AP; and
   sending, by the mobile device, to the server the absolute location of the first AP.

3. The method of claim 2 further comprising:
   sending, by the mobile device, the absolute location of the first AP to a server, wherein the server combines the absolute location of the first AP with previously stored AP location data to create an updated first AP location for communicating the first AP location to a second mobile device.

4. The method of claim 2 further comprising:
   combining, by the mobile device, the absolute location of the first AP with received signal strength indication (RSSI) measurements to create an AP map.

5. The method of claim 1, wherein the first plurality of distance-related measurements and the second plurality of distance-related measurements comprise round trip time (RTT) measurements between the mobile device and each AP.

6. The method of claim 1, wherein the first plurality of distance-related measurements and the second plurality of distance-related measurements comprise received signal strength indication (RSSI) measurements.

7. The method of claim 1, further comprising using a turnaround calibration factor (TCF) for each AP in determining, by the mobile device, the inter-distance measurement of the first AP and the second AP, wherein TCF for an AP comprises turn-around time of the AP between reception of a packet and retransmission of a response packet.

8. The method of claim 7, wherein the turn-around time of the AP comprises at least processing time of the AP for responding to a request from the mobile device.

9. The method of claim 7, wherein the TCF for at least the first AP is determined by the mobile device, and determining the TCF comprises:
   obtaining, at the mobile device, at least three distance-related measurements between the mobile device and the first AP, wherein each of the at least three distance-related measurements are obtained at different locations;

obtaining, at the mobile device, TCF-related location information of the mobile device each time one of the at least three distance-related measurements is obtained; and determining, by the mobile device, the TCF of the first AP, based at least in part on the at least three distance-related measurements and the TCF-related location information of the mobile device obtained during each time the at least three distance-related measurements are obtained.

10. The method of claim 1 wherein the relative change in location associated with the movement of the mobile device comprises at least determining, by the mobile device, relative locations based on a pedometer or/and an inertial sensor operated by the mobile device.

11. A mobile device, comprising:
a transceiver configured to:
obtain a first plurality of distance-related measurements associated with a first location, comprising at least a first distance-related measurement between a mobile device at the first location and a first AP and a second distance-related measurement between the mobile device at the first location and a second AP; and
obtain a second plurality of distance-related measurements associated with a second location, comprising at least a third distance-related measurement between the mobile device at the second location and the first AP and a fourth distance-related measurement between the mobile device at the second location and the second AP;
a processor configured to:
determine a relative change in location associated with a movement of the mobile device from the first location to the second location; and
determine a relative location of the first AP compared with the second AP by determining an inter-distance measurement of the first AP and the second AP, based at least in part on the first plurality of distance-related measurements, the second plurality of distance-related measurements and the relative change in location.

12. The mobile device of claim 11, further configured to:
obtain an absolute location of the second AP from a server or a Global Navigation Satellite System (GNSS);
determine the absolute location of the first AP, by the processor, based at least in part on the absolute location of the second AP and the inter-distance measurement of the first AP and the second AP; and
send the absolute location of the first AP to the server.

13. The mobile device of claim 12 further comprising:
sending the absolute location of the first AP to a server for combining the absolute location of the first AP with previously stored AP location data to create an updated first AP location, and for communicating the updated first AP location to a second mobile device.

14. The mobile device of claim 12, further configured to:
combine the absolute location of the first AP with received signal strength indication (RSSI) measurements to create an AP map.

15. The mobile device of claim 11, wherein the first plurality of distance-related measurements and the second plurality of distance-related measurements comprise round trip time (RTT) measurements between the mobile device and each AP.

16. The mobile device of claim 11, wherein the first plurality of distance-related measurements and the second plurality of distance-related measurements comprise received signal strength indication (RSSI) measurements.

17. The mobile device of claim 11, further comprising using a turnaround calibration factor (TCF) for each AP in determining the inter-distance measurement of the first AP and the second AP, by the processor, wherein TCF for an AP comprises turn-around time of the AP between reception of a packet and retransmission of a response packet.

18. The mobile device of claim 17, wherein the turn-around time of the AP comprises at least processing time by the AP for responding to a request from the mobile device.

19. The mobile device of claim 17, wherein the TCF for at least the first AP is determined by the mobile device, and the mobile device is configured to determine the TCF by:
obtaining at least three distance-related measurements between the mobile device and the first AP, wherein each of the at least three distance-related measurements are obtained at different locations;
obtaining TCF-related location information of the mobile device each time one of the at least three distance-related measurements is obtained; and
determining the TCF of the first AP, based at least in part on the at least three distance-related measurements and the TCF-related location information of the mobile device obtained during each time the at least three distance-related measurements are obtained.

20. The mobile device of claim 11, wherein the relative change in location associated with the movement of the mobile device is configured to at least determine relative locations based on a pedometer or/and an inertial sensor operated by the mobile device.

21. A non-transitory computer readable storage medium, wherein the non-transitory computer readable storage medium comprises instructions executable by a processor, the instructions comprising instructions to:
obtain, at the mobile device, a first plurality of distance-related measurements associated with a first location, comprising at least a first distance-related measurement between a mobile device at the first location and a first AP and a second distance-related measurement between the mobile device at the first location and a second AP;
obtain, at the mobile device, a second plurality of distance-related measurements associated with a second location, comprising at least a third distance-related measurement between the mobile device at the second location and the first AP and a fourth distance-related measurement between the mobile device at the second location and the second AP;
determine, by the mobile device, a relative change in location associated with a movement of the mobile device from the first location to the second location; and
determine, by the mobile device, a relative location of the first AP compared with the second AP by determining an inter-distance measurement of the first AP and the second AP, based at least in part on the first plurality of distance-related measurements, the second plurality of distance-related measurements and the relative change in location.

22. The non-transitory computer readable storage medium of claim 21, further configured to:
obtain, by the mobile device, an absolute location of the second AP from a server or a or a Global Navigation Satellite System (GNSS);

determine, by the mobile device, the absolute location of the first AP, based at least in part on the absolute location of the second AP and the inter-distance measurement of the first AP and the second AP; and send, the absolute location of the first AP from the mobile device to the server.

23. The non-transitory computer readable storage medium of claim 21, wherein the first plurality of distance-related measurements and the second plurality of distance-related measurements comprise round trip time (RTT) measurements between the mobile device and the first AP.

24. The non-transitory computer readable storage medium of claim 21, further comprising using a turnaround calibration factor (TCF) for each AP in determining the inter-distance measurement of the first AP and the second AP, wherein TCF for an AP comprises turn-around time of the AP between reception of a packet and retransmission of a response packet.

25. A mobile device, comprising:
means for obtaining a first plurality of distance-related measurements associated with a first location, comprising at least a first distance-related measurement between a mobile device at the first location and a first AP and a second distance-related measurement between the mobile device at the first location and a second AP;

means for obtaining a second plurality of distance-related measurements associated with a second location, comprising at least a third distance-related measurement between the mobile device at the second location and the first AP and a fourth distance-related measurement between the mobile device at the second location and the second AP;

means for determining a relative change in location associated with a movement of the mobile device from the first location to the second location; and means for determining a relative location of the first AP compared with the second AP by determining an inter-distance measurement of the first AP and the second AP, based at least in part on the first plurality of distance-related measurements, the second plurality of distance-related measurements and the relative change in location.

26. The mobile device of claim 25, further comprising:
means for obtaining an absolute location of the second AP from a server or a or a Global Navigation Satellite System (GNSS);

means for determining the absolute location of the first AP, based at least in part on the absolute location of the second AP and the inter-distance measurement of the first AP and the second AP; and means for sending the absolute location of the second AP to the server.

27. The mobile device of claim 25, wherein the first plurality of distance-related measurements and the second plurality of distance-related measurements comprise round trip time (RTT) measurements.

28. The mobile device of claim 25, further comprising using a turnaround calibration factor (TCF) for each AP in determining the inter-distance measurement of the first AP and the second AP, wherein TCF for an AP comprises turn-around time of the AP between reception of a packet and retransmission of a response packet.

* * * * *